(12) United States Patent
Paine et al.

(10) Patent No.: US 11,691,269 B2
(45) Date of Patent: Jul. 4, 2023

(54) ROBOTIC MANIPULATOR HAVING A PLURALITY OF SPRING COMPENSATED JOINTS

(71) Applicant: APPTRONIK, INC., Austin, TX (US)

(72) Inventors: Nicholas Paine, Austin, TX (US); Jonas Alexan Fox, Austin, TX (US); Bradley Aaron Resh, Austin, TX (US)

(73) Assignee: Apptronik, Inc., Austin, TX (US)

( * ) Notice: Subject to any disclaimer, the term of this patent is extended or adjusted under 35 U.S.C. 154(b) by 146 days.

(21) Appl. No.: 17/290,554

(22) PCT Filed: Oct. 30, 2019

(86) PCT No.: PCT/US2019/058790
§ 371 (c)(1),
(2) Date: Apr. 30, 2021

(87) PCT Pub. No.: WO2020/092516
PCT Pub. Date: May 7, 2020

(65) Prior Publication Data
US 2021/0347039 A1 Nov. 11, 2021

Related U.S. Application Data

(60) Provisional application No. 62/752,802, filed on Oct. 30, 2018.

(51) Int. Cl.
*B25J 9/10* (2006.01)
*B25J 9/06* (2006.01)
(Continued)

(52) U.S. Cl.
CPC ............ *B25J 9/1005* (2013.01); *B25J 9/06* (2013.01); *B25J 9/1065* (2013.01); *B25J 9/126* (2013.01);
(Continued)

(58) Field of Classification Search
CPC . B25J 9/06; B25J 9/1005; B25J 9/1065; B25J 9/126; B25J 13/085; B25J 19/0016; F16H 21/44
See application file for complete search history.

(56) References Cited

U.S. PATENT DOCUMENTS

| 5,435,515 A | 7/1995 | DiGiulio et al. |
| 7,331,750 B2 | 2/2008 | Merz et al. |

(Continued)

FOREIGN PATENT DOCUMENTS

| CN | 203204283 U | * | 9/2013 |
| WO | WO2017127683 | | 7/2017 |

OTHER PUBLICATIONS

Altenburger et al., "Design of a Passive, iso-elastic upper limb exoskeleton for gravity compensation," Robomech Journal, 2016, 7 pages.

(Continued)

*Primary Examiner* — Dale Moyer
(74) *Attorney, Agent, or Firm* — Fish & Richardson P.C.

(57) ABSTRACT

A robotic manipulator comprises a plurality of spring compensated joints, each including a four-bar linkage mechanism, a gravity compensating spring, a spring adjustment mechanism, a spring adjustment actuator and an inertial actuator. The gravity compensating spring is coupled between two links of the four-bar linkage mechanism at two different spring attachment points to provide a lifting force opposing a gravitational load force. The spring adjustment mechanism is coupled to alter a position of one of the spring attachment points. The spring adjustment actuator is coupled to move the spring adjustment mechanism to alter the position of the spring attachment point and adjust the amount of lifting force provided by the spring. The inertial actuator is coupled between links of the four-bar linkage mechanism to effectuate rotational movement of the four-bar (Continued)

linkage mechanism and apply an adjustable amount of force to accelerate and manipulate a payload handled by the robotic manipulator.

35 Claims, 8 Drawing Sheets

(51) Int. Cl.
  *B25J 9/12* (2006.01)
  *B25J 13/08* (2006.01)
  *B25J 19/00* (2006.01)
  *F16H 21/44* (2006.01)
  *B25J 15/00* (2006.01)

(52) U.S. Cl.
  CPC ......... *B25J 13/085* (2013.01); *B25J 19/0016* (2013.01); *F16H 21/44* (2013.01); *B25J 15/00* (2013.01)

(56) References Cited

U.S. PATENT DOCUMENTS

| | | | |
|---|---|---|---|
| 7,618,016 | B2 | 11/2009 | Brown |
| 8,066,251 | B2 | 11/2011 | Brown |
| 10,040,207 | B1 | 8/2018 | Cheng |
| 2006/0263082 | A1* | 11/2006 | Brown ............... F16M 11/18 248/278.1 |
| 2007/0080275 | A1* | 4/2007 | Stachowski ........ F16M 11/2014 248/323 |
| 2007/0156122 | A1 | 7/2007 | Cooper |
| 2008/0205975 | A1 | 8/2008 | Van Ham |
| 2011/0127390 | A1* | 6/2011 | Brown ............... A61F 5/3761 108/50.14 |
| 2013/0061709 | A1 | 3/2013 | Kim et al. |
| 2018/0112817 | A1* | 4/2018 | Bax .................. F16M 11/12 |
| 2019/0291285 | A1* | 9/2019 | Preuss .............. B25J 9/0006 |

OTHER PUBLICATIONS

"Balanced-arm lamp" [retrieved from <<<https://en.wikipedia.org/wiki/Balanced-arm_lamp, 2021>>], 14 pages.
"G-50X ARM" [retrieved from <<http://tiffen.com/steadicam/steadicam-accessories/g-50x-arm-2>>, 3 pages.
STEADICAM® G-50x ARM Operating Manual, 7 pages.
"G-70x ARM" [retrieved from <<https://web.archive.org/web/20160215225304/http:/tiffen.com/stead icam/steadicam-accessories/g-70x-arm/>>, 4 pages.
STEADICAM® G-70x ARM Operating Manual, 8 pages.
"Iso-elastic," [retrieved from <<https://en.wikipedia.org/wiki/Iso-elastic>>, 2 pages.
Lenzo et al., "New gravity balancing technique and hybrid actuation concept for spatial serial manipulators," 2014, 9 pages.
Lenzo et al., "An Innovative Actuation Concept for a New Hybrid Robotic System," PercRo Lab—TeCIP Institute, 2012, 8 pages.
Connor Shannon, "Robot Arm Mechanical Design," Oct. 17, 2012, 8 pages.
PR2 Maintenance, ROS + PR2 Training workshop, 28 pages.
Rahman et al., "A Simple Technique to Passively Gravity-Balance Articulated Mechanisms," ASME. J. Mech., 1995, 11 pages.
Extended European Search Report in European Appln. No. 19878009.0, dated Aug. 16, 2022, 6 pages.
International Preliminary Report on Patentability in International Appln. No. PCT/US2019/058790, dated May 14, 2021, 8 pages.
International Search Report and Written Opinion issued for PCT Patent Application No. PCT/US2019/058790, 9 pages.
Albu-Schaffer et al., "The DLR Lightweight Ro bot: Design and Control Concepts for Robot in Human Environments," Engineering, Computer Science, 2007, 8 pages.

* cited by examiner

ROBOTIC MANIPULATOR HAVING A PLURALITY OF SPRING COMPENSATED JOINTS

CROSS-REFERENCE TO RELATED APPLICATIONS

This is a national stage application of and claims the benefit of priority to International Application No. PCT/US2019/058790 filed Oct. 30, 2019, entitled "ROBOTICS MANIPULATOR HAVING A PLURALITY OF SPRING COMPENSATED JOINTS," which claims priority to U.S. Provisional Application No. 62/752,802, filed on Oct. 30, 2018, entitled "Robotic Manipulator Having a Plurality of Spring Compensated Joints" which the entire contents of which are hereby expressly incorporated herein by reference for all purposes.

PRIORITY CLAIM

This application is a continuation of and claims priority to U.S. Provisional Application No. 62/752,802, filed on Oct. 30, 2018 and entitled "Robotic Manipulator Having A Plurality Of Spring Compensated Joints" the entire disclosure of which is incorporated herein by reference.

FIELD

This invention relates generally to robotic manipulators, and more particularly, to robotic manipulators comprising spring compensated joints.

BACKGROUND

Robotic manipulators are designed to manipulate the position and orientation of a payload in a three-dimensional (3-D) spatial environment. Some robotic manipulators include a plurality of robotic links, which are interconnected by articulated joints. For the past seven decades, robotic manipulators have been built using a serial chain of actuators which include geared electric motors at each joint of the robotic manipulator to effectuate motion. Geared electric motors have been the primary choice for actuator type due to the prevalence of electrical power and efficiency of electric motors, which have good power-per-weight, but poor torque-per-weight. As a result, gearing is typically used to reduce the speed of the electric motor and to increase the torque. Today, most robotic manipulators are built using a serial chain of highly geared electric motors. Unfortunately, using highly geared electric motors increases the apparent inertia of these robotic manipulators, reducing their safety and robustness when collisions with the environment are a possibility.

It is generally well known that robotic manipulators are subjected to various torques, including inertial, friction, gravity, and external torques. A simplified diagram is provided in FIG. 1 to demonstrate the various torques that a single link 10 of a robotic manipulator may be subjected to. In the simplified diagram, a link 10 having a center of mass (m) at length (l) is attached at one end to mechanical ground 20 in such a way that enables the freely moving end 12 of the link to rotate, thereby adjusting the orientation ($\theta$) of the link. As the orientation ($\theta$) of the link changes, the torque ($\tau_a$) on the link changes according to:

$$\tau_a = \tau_i + \tau_b + \tau_g + \tau_{ext} = ml^2\ddot{\theta} + b\dot{\theta} + mgl\sin\theta + \tau_{ext}$$

wherein '$\tau_i$' represents the inertial torque, '$\tau_b$' represents the viscous friction torque, '$\tau_g$' represents the gravity torque, and '$\tau_{ext}$' represents external torques on the link. Inertial torques depend on the magnitude of accelerations of the link, whereas viscous friction torques depend on the velocity of the link. External torques are created by external disturbances, such as for example, a human pushing on the link. Gravity torques, which are typically much larger than the other torque sources, are constant and position dependent. In order to compensate for the effects of gravity on the robotic manipulator and its payload, the actuators used within the robotic actuator are typically required to generate high amounts of torque.

Recently, gravity balancing techniques have been used in robotic manipulators to offset at least a portion of the gravity torque ($\tau_g$) on the manipulator, and thereby decrease the required actuator efforts during motion. For example, some robotic manipulators may incorporate a gravity compensating spring within a base joint of the manipulator. However, the springs included within conventional robotic manipulators are passive elements, which are only used to counterbalance the weight of the robot, so that it ideally behaves as if its motion is in a gravity-less environment when not carrying a payload. Although the springs can be used to at least partially offset gravity torques, conventional robotic manipulators do not provide a means to dynamically alter the amount of gravity compensating torque applied by the springs when the manipulator picks up an object and the weight of the payload changes. This limitation significantly hinders conventional robotic manipulators since an actuator, and not a spring, must provide the torque needed to lift the additional payload.

Over the years, gravity-balancing mechanisms using counterweights, springs, and parallelograms have been used in many applications, such as balanced arm lamps, TV mounts and video camera supports, to compensate for the effect of gravity on a load. These mechanisms, while useful in many applications, use only passive elements (i.e., the springs) to compensate for gravitational forces on the load. In order to move the load in a spatial environment, an operator or user of the mechanism must apply the force needed to accelerate and manipulate the load.

For example, FIG. 2A provides a conceptual diagram of a gravity-balancing mechanism 30 including a serial chain of n parallelograms (e.g., four-bar linkages), which constrain motion between the links 32 in a way that allows translation but not rotation of opposite links. Because of this property, if one link in a parallelogram is mechanically grounded, any torque applied to its opposite side (i.e., the freely moving side) is transmitted directly through the mechanism to ground. To compensate for gravitational loads applied to the freely moving side of gravity-balancing mechanism 30, a gravity compensating spring ($k_1 \ldots k_n$) may be attached diagonally within each parallelogram between attachment points A and B. When coupled in such a manner, the spring provides a lifting force ($F_b$) that opposes the gravitational force ($F_g$) on the load.

FIG. 2B illustrates the tension and compression forces ($F_a$, $F_b$, and $F_c$) generated within a single parallelogram shown in FIG. 2A when a gravity compensating spring ($k_i$) is attached diagonally between two links of the parallelogram at spring attachment points A and B. As shown in FIG. 2B, the forces generated within the parallelogram are related to the geometric lengths of a triangle formed between the gravity compensating spring and the links to which it is connected. Using force vector addition, the tension and compression forces may be expressed as:

$$\frac{F_a}{a} = \frac{F_b}{b} = \frac{F_c}{c},$$

where 'a' is the length between attachment point A and one corner of the parallelogram, b' is the length between attachment point B and the same corner of the parallelogram, and 'c' is the length of the spring. In the equation above, '$F_c$' is the restoring force generated by a spring of length 'c', '$F_b$' is the lifting force generated along length 'b' that opposes the gravitational load force ($F_g$), and '$F_a$' is the tension force generated along length 'a'.

In the case of an ideal spring, the lifting force ($F_b$) provided by the gravity compensating spring may be expressed as:

$$F_b = \frac{b}{c}F_c = \frac{b}{c}kc = kb = \text{constant},$$

where, 'k' is the spring constant. For an ideal spring, the lifting force ($F_b$) is independent of spring length (c), and therefore, constant for any orientation (θ). In other words, when configured with an ideal spring, gravity-balancing mechanism 30 exhibits iso-elasticity, since no external force or torque is needed to balance the weight at any orientation (θ) of the mechanism for a fixed gravitational load force ($F_g$). However, a real spring having a non-zero free length requires a prohibitively large spring to reproduce ideal spring characteristics that are independent of orientation (θ). When configured with a real spring, the lifting force ($F_b$) provided by the spring is often too low at upper positions and too high at lower positions, resulting in a gravity-balancing mechanism 30 that does not exhibit iso-elastic behavior at all orientations.

It is generally well known that the iso-elastic behavior of a gravity-balancing mechanism can be improved at the upper and lower positions by moving spring attachment point B. For example, U.S. Pat. No. 7,618,016 discloses a practical implementation of a gravity-balancing mechanism in the form of an iso-elastic support arm for a camera stabilizing device. The iso-elastic support arm described in the '016 patent uses parallelogram links that are biased upward by a spring, and provides a mechanism with which an operator can manually adjust the spring termination height and offset from the side of the parallelogram links. Such adjustment is provided, in one embodiment of the '016 patent, by adjustable knobs that may be rotated by an operator to: (a) raise/lower the spring attachment point to increase/decrease the lifting force provided by the spring, and/or (b) pivot the spring attachment point away from/toward the side of the link to increase/decrease gravity-balancing at upper and lower positions.

Although the manual spring adjustment means disclosed in the '016 patent can be used to improve the iso-elastic behavior of the support arm at extreme positions, the operator of the camera stabilizing device is responsible for adjusting the spring adjustment mechanism and applying the force necessary to accelerate and manipulate a specific payload. Since the operator must adjust the spring position manually (e.g., by adjusting one or more knobs) to accommodate a specific payload, the iso-elastic support arm disclosed in the '016 patent cannot support payloads that change dynamically throughout operation. While this is acceptable for cameramen applications, it is insufficient for robotic manipulators that handle constantly changing payloads. In addition, while the iso-elastic support arm disclosed in the '016 patent can be used to position a payload (e.g., a camera) in Cartesian space, the parallelogram links remain parallel to the base frame of the support arm, and therefore, cannot change the orientation of the payload.

SUMMARY OF THE INVENTION

The following description of various embodiments of apparatuses and robotic manipulators is not to be construed in any way as limiting the subject matter of the appended claims.

According to one embodiment, an apparatus in accordance with the present disclosure may generally include a four-bar linkage mechanism, at least one gravity compensating spring, a spring adjustment mechanism and a spring adjustment actuator. In some embodiments, the apparatus may be a spring compensated joint included, for example, within a robotic manipulator. In other embodiments, the apparatus may be a gravity compensating mechanism.

In the disclosed apparatus, the four-bar linkage mechanism may generally include an upper link arranged parallel to a lower link and a first side link arranged parallel to a second side link. The first and second side links may be coupled between the upper and lower links at distal ends thereof to form a parallelogram structure. The at least one gravity compensating spring may be coupled to the parallelogram structure, and may be attached between two links of the four-bar linkage mechanism at two different spring attachment points. In some embodiments, the at least one gravity compensating spring may include two gravity compensating springs, each of which may be coupled diagonally within the parallelogram structure and attached between two links of the four-bar linkage mechanism at two different spring attachment points.

The spring adjustment mechanism may be coupled to one end of the at least one gravity compensating spring to adjust a position of at least one of the spring attachment points. The spring adjustment actuator may be coupled to move the spring adjustment mechanism to alter the position of the at least one spring attachment point and dynamically alter an amount of gravity compensating torque applied by the gravity compensating spring when a payload handled by the apparatus changes.

In the present disclosure, the spring adjustment mechanism may be implemented in a variety of different ways. In some embodiments, the spring adjustment mechanism may include a slider, which is configured to adjust the position of the at least one spring attachment point by translating the at least one spring attachment point along an axis substantially parallel to the first side link, or along an axis substantially parallel to the lower link. In other embodiments, the spring adjustment mechanism may include a slider coupled to an additional four-bar linkage. In such embodiments, the additional four-bar linkage may extend the at least one spring attachment point beyond a boundary of the first side link and enable the slider to translate the at least one spring attachment point along an axis, which is not parallel to an axis extending through the first side link.

In some embodiments, the apparatus may further include an inertial actuator, which may be coupled between links of the four-bar linkage mechanism to effectuate rotational movement of the four-bar linkage mechanism and apply an adjustable amount of force to accelerate and manipulate the payload.

In the present disclosure, the inertial actuator may be implemented in a variety of different ways. In some embodiments, the inertial actuator may be a prismatic linear actuator, which is coupled diagonally between the lower link and the first side link of the four-bar linkage mechanism. In other embodiments, the inertial actuator may be a rotational actuator comprising a stator and a rotor, wherein the stator is coupled to the first side link and the rotor is coupled to the lower link, or vice versa. In yet other embodiments, the inertial actuator may be a prismatic linear actuator, which is coupled to the upper link and arranged, so that a longitudinal axis of the inertial actuator is parallel with the upper link.

In some embodiments, the apparatus may further include a slider crank mechanism, which is coupled between one end of the inertial actuator and the first side link. In such embodiments, the slider crank mechanism may be configured to convert linear motion of the inertial actuator into rotational motion of the apparatus.

In some embodiments, the apparatus may further include a slider crank mechanism and an additional four-bar linkage, which are coupled between the inertial actuator and one or more links of the four-bar linkage mechanism. In such embodiments, the slider crank mechanism and the additional four-bar linkage may be configured to convert linear motion of the inertial actuator into rotational motion of the apparatus.

According to one embodiment, a robotic manipulator in accordance with the present disclosure may generally include a serial chain of actuators and a plurality of spring compensated joints that enable the robotic manipulator to manipulate the position and the orientation of its payload in a spatial environment. Each spring compensated joint of the robotic manipulator may generally include a four-bar linkage mechanism, at least one gravity compensating spring, a spring adjustment mechanism and a spring adjustment actuator.

The four-bar linkage mechanism may include an upper link arranged parallel to a lower link and a first side link arranged parallel to a second side link. The first and second side links may be coupled between the upper and lower links at distal ends thereof to form a parallelogram structure. The at least one gravity compensating spring may be coupled between two links of the four-bar linkage mechanism at two different spring attachment points to provide a lifting force ($F_b$) in a direction opposing a gravitational force ($F_g$) on the payload. The spring adjustment mechanism may be coupled to one end of the at least one gravity compensating spring and may be configured to alter a position of at least one of the spring attachment points. The spring adjustment actuator may be coupled to move the spring adjustment mechanism, so as to alter the position of the at least one spring attachment point and dynamically adjust the amount of lifting force ($F_b$) provided by the gravity compensating spring.

In some embodiments, the at least one gravity compensating spring may include two gravity compensating springs, each of which may be coupled diagonally between two links of the four-bar linkage mechanism at two different spring attachment points.

In some embodiments, the spring adjustment mechanism may include a lead screw positioned adjacent and parallel to the first side link, and a slider coupled to the lead screw and to the one end of the at least one gravity compensating spring. In such embodiments, the spring adjustment actuator may be coupled to the lead screw and configured to adjust the position of the at least one spring attachment point by translating the lead screw up/down along an axis, which is substantially parallel to the first side link.

In some embodiments, the robotic manipulator may further include a sensor and a feedback controller, which is coupled to the sensor and the spring adjustment actuator. The sensor may be coupled to measure the force and/or torque of a payload handled by the robotic manipulator. The feedback controller may be configured to use an output of the sensor to alter the at least one spring attachment point and dynamically adjust the lifting force in real-time to compensate for gravitational load forces on dynamically varying payloads.

In some embodiments, each spring compensated joint may further include an inertial actuator, which is coupled between links of the four-bar linkage mechanism to effectuate rotational movement of the four-bar linkage mechanism and apply an adjustable amount of force to accelerate and manipulate a payload handled by the robotic manipulator. In some embodiments, the inertial actuator may be a prismatic linear actuator, which is coupled to the upper link of the four-bar linkage mechanism and arranged, so that a longitudinal axis of the inertial actuator is parallel with the upper link. In some embodiments, each spring compensated joint may further include a slider crank mechanism and a Hoeken's linkage, which are coupled between the inertial actuator and one or more links of the four-bar linkage mechanism. In such embodiments, the slider crank mechanism and the Hoeken's linkage may be configured to convert linear motion of the inertial actuator into rotational motion of the spring compensated joint.

In some embodiments, the robotic manipulator may further include a sensor and a feedback controller, which is coupled to the sensor and the inertial actuator. The sensor may be coupled to measure the force and/or torque of a payload handled by the robotic manipulator. The feedback controller may be configured to use an output of the sensor to dynamically adjust a force applied by the inertial actuator to manipulate and accelerate dynamically varying payloads.

In one embodiment, the robotic manipulator may include a plurality of spring compensated joints configured to move the robotic manipulator up and down, a plurality of yaw actuators configured to pivot the robotic manipulator side-to-side, a pitch actuator configured to move an end effector up and down, and a roll actuator configured to rotate the end effector. In one example implementation, the robotic manipulator may include a first yaw actuator coupled to mechanical ground, a first spring compensated joint coupled between the first yaw actuator and a second yaw actuator, a second spring compensated joint coupled between the second yaw actuator and a third yaw actuator, a pitch actuator coupled to the third yaw actuator, a roll actuator coupled to the pitch actuator and an end effector coupled to the roll actuator.

In another embodiment, the robotic manipulator may include a plurality of spring compensated joints configured to move the robotic manipulator up and down, a plurality of yaw actuators configured to pivot the robotic manipulator side-to-side, a serial chain of actuators and an end effector. In one example implementation, the robotic manipulator may include a first yaw actuator coupled to mechanical ground, a first spring compensated joint coupled between the first yaw actuator and a second yaw actuator, a second spring compensated joint coupled between the second yaw actuator and the serial chain of actuators, which are further coupled to the end effector.

In some embodiments, the serial chain of actuators may include a first actuator coupled to one end of the second spring compensated joint, a second actuator coupled to the first actuator, and a third actuator coupled to the second actuator. The first actuator may be configured to rotate the end effector about a tilted axis, the second actuator may be configured to rotate the end effector up and down, and the third actuator may be configured to rotate the end effector side-to-side.

BRIEF DESCRIPTION OF THE DRAWINGS

Other advantages of the present disclosure will become apparent upon reading the following detailed description and upon reference to the accompanying drawings in which:

FIG. 1 (prior art) is a simplified diagram demonstrating the various torques that a single link robotic manipulator is subjected to;

Figure 1:
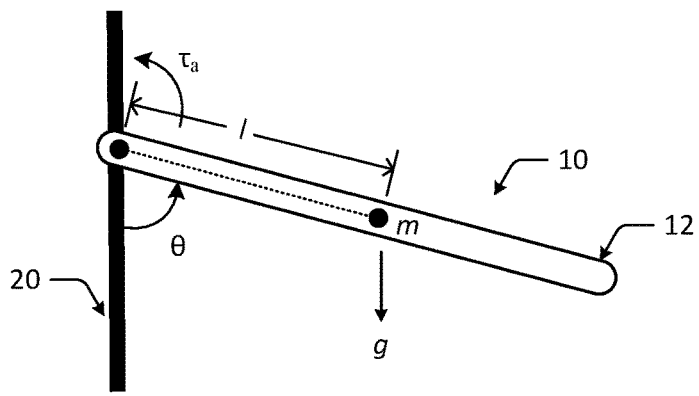

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

FIGS. 3-13 depict various embodiments of a robotic manipulator including a plurality of spring compensated joints. As described in more detail below, each joint of the disclosed robotic manipulator may include a four-bar linkage mechanism, at least one gravity compensating spring coupled between links of the four-bar linkage mechanism at two different spring attachment points, a spring adjustment mechanism coupled to one end of the gravity compensating spring and configured to adjust a position of at least one of the spring attachment points, a spring adjustment actuator coupled to alter the position of the at least one spring attachment point and adjust the lifting force ($F_b$) provided by the spring, and an inertial actuator coupled between links of the four-bar linkage mechanism to effectuate rotational movement of the four-bar linkage mechanism and to apply an adjustable amount of force to accelerate and manipulate a payload handled by the robotic actuator.

Unlike conventional gravity-balancing mechanisms and robotic manipulators that utilize gravity balancing techniques, the robotic manipulator depicted in FIGS. 3-13 uses active actuation and feedback control to adjust the amount of lifting force provided by the spring and dynamically alter the amount of gravity compensating torque applied by the spring when the payload changes. This enables the disclosed robotic manipulator to maintain gravity balance with dynamically varying payloads, and reduces the actuator efforts needed to accelerate and manipulate a payload regardless of weight.

Figure 3:
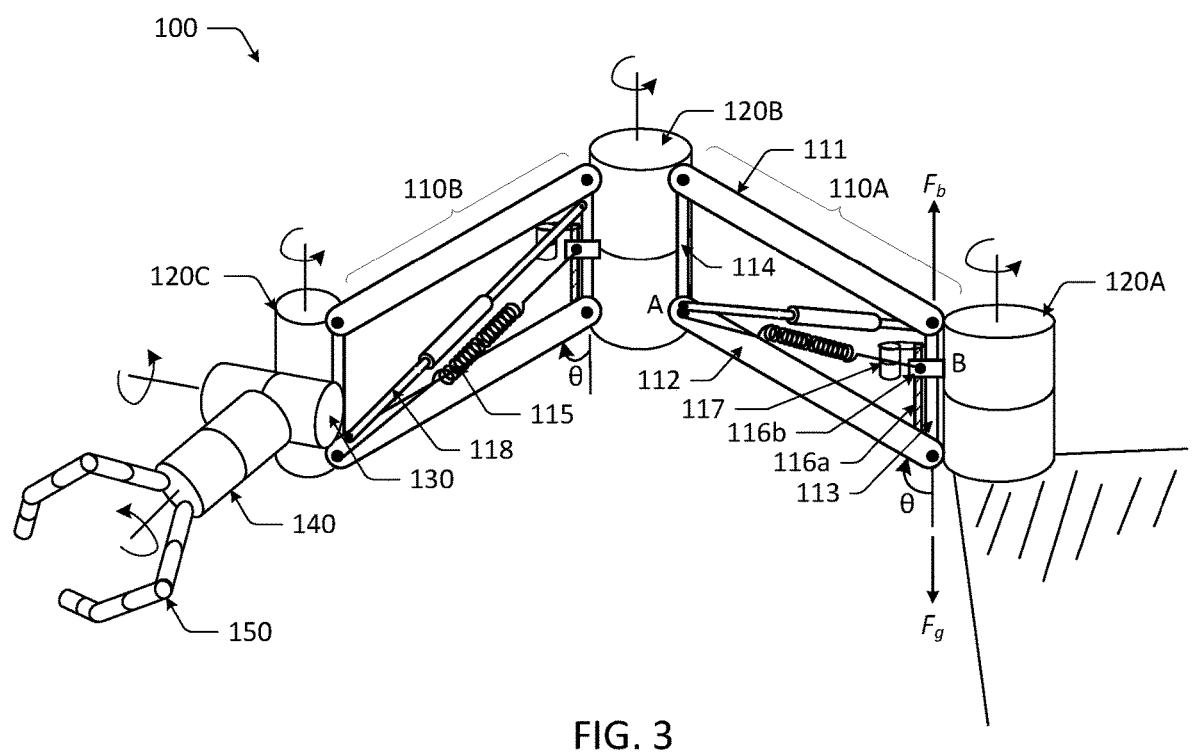
FIG. 3 is a side perspective view illustrating one embodiment of a robotic manipulator having a plurality of spring compensated joints, where each joint includes a gravity compensating spring, a spring adjustment mechanism, a spring adjustment actuator and an inertial actuator.

FIG. 3 is a conceptual diagram of a robotic manipulator 100 having a plurality of spring compensated joints 110 in accordance with one embodiment of the present disclosure. In the embodiment shown in FIG. 3, robotic manipulator 100 includes a first spring compensated joint 110A and a second spring compensated joint 110B. Although only two spring compensated joints are shown in FIG. 3, it is expressly noted that robotic manipulator 100 may include one or more additional joints and actuators to provide greater range of motion.

As described in more detail below, each spring compensated joint 110 of robotic manipulator 100 includes a four-bar linkage mechanism (111, 112, 113, 114), a gravity compensating spring 115, a spring adjustment mechanism 116, a spring adjustment actuator 117 and an inertial actuator 118. In some embodiments, one or more components of the disclosed spring compensated joint may be configured and/or implemented differently than what is expressly depicted in FIG. 3, while retaining the functionality described herein. The present disclosure is considered to encompass all such configurations and alternative implementations.

In the embodiment shown in FIG. 3, a first spring compensated joint 110A is coupled at one end to a first yaw actuator 120A, which is coupled to mechanical ground. An opposite end of the first spring compensated joint 110A is coupled to a second yaw actuator 120B, which in turn, is coupled to one end of the second spring compensated joint 110B. An opposite end of the second spring compensated joint 110B is coupled to a third yaw actuator 120C, which in turn, is coupled to pitch actuator 130, roll actuator 140 and end effector 150. The yaw actuators 120, pitch actuator 130, roll actuator 140 included within the robotic manipulator 100 are inertial actuators, which may be driven to change the position and orientation of the manipulator.

The robotic manipulator 100 shown in FIG. 3 includes serial chain of spring compensated joints and actuators, which enable the robotic manipulator to control the position and the orientation of its payload in a 3-D spatial environment. For example, each yaw actuator 120A, 120B and 120C is configured to pivot the robotic manipulator side-to-side in a plane orthogonal to the gravity vector, while the spring compensated joints 110A and 110B are configured to move the robotic manipulator up and down by adjusting the joint orientation angle θ. At the freely moving end (e.g., the wrist portion of the robotic manipulator), yaw actuator 120C is configured to pivot the end effector 150 side-to-side, pitch actuator 130 is configured to rotate the end effector 150 up and down, while roll actuator 140 is configured to rotate the end effector around its primary axis.

In some embodiments, yaw actuators 120, pitch actuator 130 and roll actuator 140 may be implemented with substantially any type of rotary actuator (e.g., electric, hydraulic, etc.). In one example implementation, yaw actuators 120, pitch actuator 130 and roll actuator 140 may each be implemented with some form of geared electromagnetic rotary actuator including an electric motor coupled to a gearbox or drivetrain. In other embodiments, the yaw actuators 120 may be implemented with a linear actuator if additional means are provided for converting the linear motion of the actuator into rotational motion. For example, if yaw actuators 120 are implemented with linear actuators, an additional slider crank mechanism can be provided at each joint to convert the linear motion of the linear actuator into rotational motion at the joint.

In another embodiment, a substantially different configuration of actuators may be used at the freely moving end (e.g., the wrist portion) of the robotic manipulator 100 in lieu of yaw actuator 120C, pitch actuator 130 and roll actuator 140. Similar to the embodiment shown in FIG. 3, an alternative wrist design may include three rotary actuators coupled in series between the last spring compensated joint (e.g., joint 110B) and the end effector 150. In the alternative wrist design, however, a first rotary actuator (e.g., a 45° actuator) coupled to the last spring compensated joint may be configured to rotate the end effector 150 about a tilted axis, which is displaced from the Z-axis by an acute angle (e.g., about 45°). A second rotary actuator (e.g., a pitch actuator) coupled to the first rotary actuator may be configured to rotate the end effector 150 up and down, and a third actuator (e.g., a yaw actuator) coupled to the first rotary actuator may be configured to rotate the end effector 150 side to side.

When configured in such a manner, the first, second and third rotary actuators enable end effector 150 to rotate along its primary axis (e.g., the vertical axis), which is helpful when picking up an object and rotating about its primary axis. The first, second and third rotary actuators also enable continuous rotation of the last joint in the chain, which is helpful for tasks like turning a screwdriver. Two common manipulation poses are also accommodated with the alternative wrist design: 1) top down manipulation (e.g., picking up something from overhead), and 2) horizontal manipulation (e.g., picking up something sideways, such as an object located on a horizontally accessible shelf).

Returning to FIG. 3, each spring compensated joint 110A and 110B includes a four-bar linkage mechanism comprising an upper link 111 arranged parallel to a lower link 112, and a first side link 113 arranged parallel to a second side link 114. The first and second side links 113 and 114 are coupled between the upper and lower links 111 and 112 at distal ends thereof to form a parallelogram structure, which constrains motion between the links of the four-bar linkage mechanism in a way that allows translation, but not rotation, of opposite links. Because of this property, any torque applied to end effector 150 (i.e., at the freely moving end) is transmitted directly through the serially coupled actuators and joints of robotic manipulator 100 to mechanical ground.

In general, gravity compensating spring 115 may be coupled to the parallelogram structure of each spring compensated joint 110A/110B between two links of the four-bar linkage mechanism. In the example embodiment shown in FIG. 3, spring 115 is coupled diagonally between attachment point A on lower link 112 and attachment point B on first side link 113. When coupled in such a manner, spring 115 provides a lifting force ($F_b$) in a direction opposing the gravitational load force ($F_g$). It is recognized, however, that the gravity compensating spring 115 may provide a lifting force ($F_b$) without being attached diagonally between links of the four-bar linkage mechanism, as shown in FIG. 3. In some embodiments, the gravity compensating spring 115 may be alternatively oriented and attached, for example, to a cable that spans the four-bar linkage mechanism diagonally via pulleys. Together, the gravity compensating spring, cable and pulleys may provide the lifting force ($F_b$) needed to oppose the gravitational load force ($F_g$). In some embodiments, one or more characteristics (e.g., length, stiffness, etc.) of the gravity compensating spring 115 may be selected to counter-balance the weight of robotic manipulator 100 and its payload, so that it ideally behaves as if its motion is in a gravity-less environment when carrying a payload.

As noted above, robotic manipulator 100 improves upon conventional gravity-balancing systems and robotic manipulators that utilize gravity balancing techniques, in at least one respect, by using active actuation and feedback control to adjust the amount of lifting force ($F_b$) provided by the gravity compensating spring 115 and dynamically alter the amount of gravity compensating torque applied by the spring when the payload changes. In order to do so, each spring compensated joint 110A and 110B may include a spring adjustment mechanism 116 and a spring adjustment actuator 117, as shown in FIG. 3.

In general, spring adjustment mechanism 116 and spring adjustment actuator 117 may be configured to alter a position of one or more attachment points of the gravity compensating spring 115, so as to adjust the amount of lifting force ($F_b$) provided thereby. In the example embodiment shown in FIG. 3, spring adjustment mechanism 116 includes a lead screw 116a which is positioned adjacent and parallel to the first side link 113, and a slider 116b which is fixedly attached to the lead screw. One end of the gravity compensating spring 115 is attached to lower link 112 at spring attachment point A, while the other end of the spring is attached to slider 116b at spring attachment point B.

In the embodiment shown in FIG. 3, spring adjustment actuator 117 is coupled to lead screw 116a and configured to adjust the position of spring attachment point B by translating the lead screw up/down along an axis parallel to the first side link 113. By driving the lead screw (and thus, the slider 116b fixedly attached thereto) to a desired position, spring adjustment actuator 117 provides the active actuation needed to alter the position of spring attachment point B and adjust the lifting force ($F_b$) provided by the gravity compensating spring 115. In one embodiment, spring adjustment actuator 117 may be a linear actuator having an electric motor, which is directly or indirectly connected to lead screw 116*a*. In one example implementation, the motor shaft of the linear actuator may be mounted directly onto a distal end of lead screw 116*a* to drive the lead screw up and down. In another example implementation, a belt system may be used to connect the motor shaft of the linear actuator to the lead screw 116*a*, as shown in FIG. 3.

Spring adjustment actuator 117 is configured to provide an adjustable lifting force ($F_b$) to counteract substantially 100% of the gravity torque on robotic manipulator 100 regardless of payload. In some embodiments, a sensor and feedback controller may be coupled to spring adjustment actuator 117 (as shown, e.g., in FIG. 11) to adjust the lifting force needed to compensate for gravitational load forces on dynamically varying payloads. In this manner, the spring adjustment mechanism 116, the spring adjustment actuator 117, and the sensor and feedback controller may be used to dynamically adjust the spring position in real-time, so that robotic manipulator 100 is nearly perfectly gravity compensated regardless of payload.

In addition to spring adjustment actuator 117, each spring compensated joint 110A/110B may include an inertial actuator 118, which is configured to apply an adjustable amount of force to accelerate and manipulate the payload. Because spring adjustment actuator 117 provides a gravity compensating torque that offsets substantially 100% of the gravity torque (i.e., the largest torque source) on robotic manipulator 100, inertial actuator 118 only needs to compensate for the remaining torque sources (i.e., inertial, friction and external torques) when moving the robotic manipulator from point to point. This greatly reduces the effort and energy consumed by the inertial actuator 118.

Unlike spring adjustment actuator 117, the inertial actuator 118 is not coupled to the gravity compensating spring 115 or configured to alter a position of the spring attachment points A and B. Instead, the inertial actuator 118 is coupled between links of the spring compensated joint 110 to effectuate rotational movement of the joint and apply an adjustable amount of force to accelerate and manipulate the payload. In the embodiment shown in FIG. 3, the inertial actuator 118 is coupled diagonally between the lower link 112 and first side link 113 of the spring compensated joint 110, and is arranged above and substantially in parallel with the gravity compensating spring 115. When coupled in such a manner, the inertial actuator 118 is configured to actively adjust the magnitude of the force applied by the inertial actuator to move the robotic manipulator 100 up/down and to accelerate and deaccelerate the joint while counteracting external disturbances.

Assuming the first side link 113 is adjacent to mechanical ground, for example, the inertial actuator 118 shown in the embodiment of FIG. 3 may be compressed to increase the magnitude of the acceleration force applied to the first side link 113 to raise the opposing side of the joint (i.e., the side comprising second side link 114), thereby increasing the joint orientation angle θ and moving the robotic manipulator 100 in an upward direction. On the other hand, the inertial actuator 118 may be extended to decrease the magnitude of the acceleration force applied to the first side link 113 to lower the opposing side of the joint, thereby decreasing the joint orientation angle θ and moving the robotic manipulator 100 in a downward direction. In some embodiments, the inertial actuator 118 may be configured to increase or decrease the force needed to accelerate/deaccelerate and manipulate a fixed payload in a desired direction. In some embodiments, a sensor and feedback controller may be coupled to the inertial actuator 118 (as shown, e.g., in FIG. 11) to dynamically adjust the force needed to manipulate and accelerate payloads regardless of weight.

In one embodiment, the inertial actuator 118 shown in FIG. 3 may be a prismatic linear actuator having an electric motor mechanically coupled to one end of a screw drive mechanism. The screw drive mechanism may be coupled to a lead nut, which may be coupled to lower link 112 near spring attachment point A. In this manner, the inertial actuator 118 may be configured to translate the second side link 114 with respect to the first side link 113 to effectuate rotational motion of the joint. It is noted, however, that inertial actuator 118 is not strictly limited to a prismatic linear actuator in all embodiments, and may be alternatively implemented with other types of actuators known in the art. It is further noted that the inertial actuator 118 may be coupled to the spring compensated joint 110 in a manner that differs from that expressly shown in FIG. 3. Although not strictly limited to such, FIGS. 7-10 illustrate how different types of inertial actuators 118 may be coupled to spring compensated joint 110 in accordance with various embodiments of the present disclosure.

It is noted that FIG. 3 illustrates only one example embodiment of a spring compensated joint 110 comprising a four-bar linkage mechanism (111, 112, 113, 114), a gravity compensating spring 115, a spring adjustment mechanism 116 configured to alter a position of one or more attachment points of the gravity compensating spring 115, a spring adjustment actuator 117 configured to dynamically adjust a lifting force ($F_b$) provided by the gravity compensating spring 115, and an inertial actuator 118 configured to apply a force (e.g., an acceleration force) needed to accelerate and manipulate a payload regardless of weight. However, robotic manipulator 100 is not strictly limited to the particular arrangement and implementation of components shown in FIG. 3. In some embodiments, robotic manipulator 100 may include additional spring compensated joints and actuators to provide greater range of motion, where each joint includes a four-bar linkage mechanism (111, 112, 113, 114), a gravity compensating spring 115, a spring adjustment mechanism 116, a spring adjustment actuator 117 and an inertial actuator 118.

Figure 4:
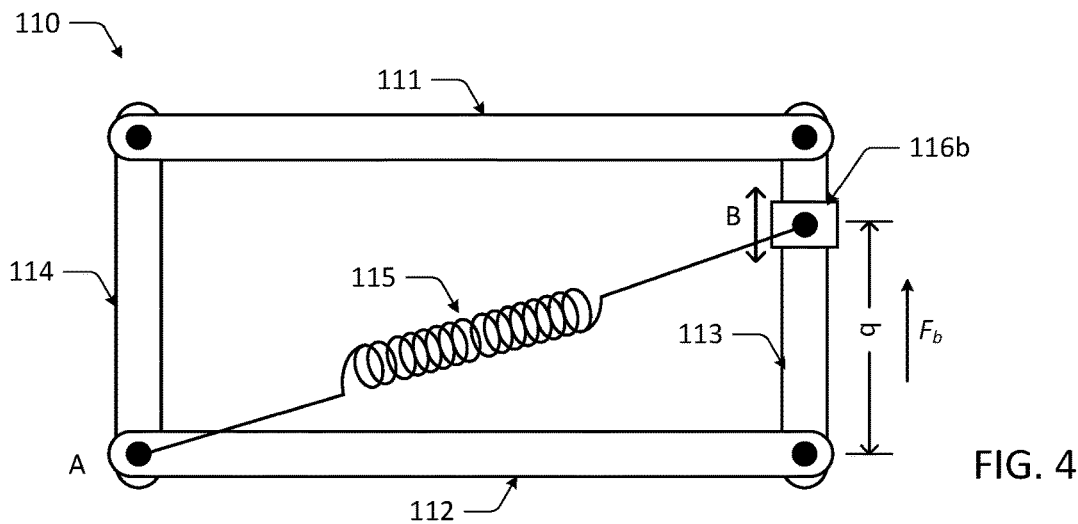
FIG. 4 is a simplified diagram of a single spring compensated joint that may be included within the robotic manipulator of FIG. 3, depicting the spring adjustment mechanism positioned at spring attachment point B.
Figure 5:
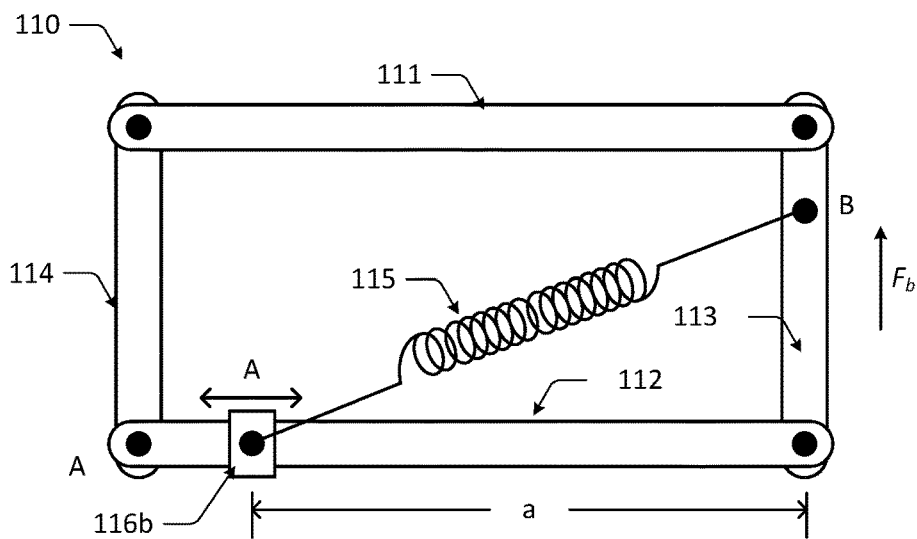
FIG. 5 is a simplified diagram of a single spring compensated joint that may be included within the robotic manipulator of FIG. 3, depicting the spring adjustment mechanism positioned at spring attachment point A.
Figure 6:
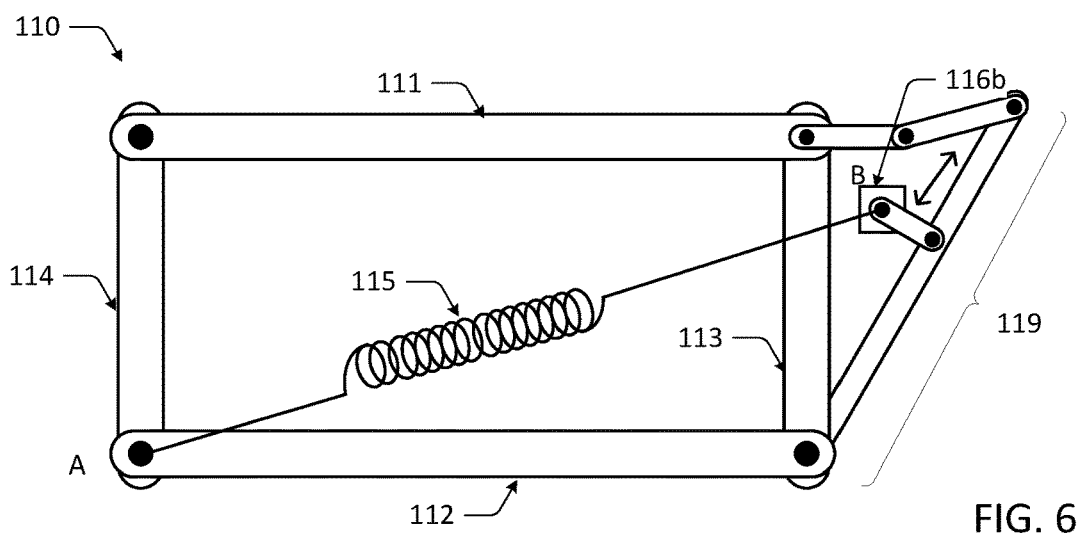
FIG. 6 is a simplified diagram of a single spring compensated joint that may be included within the robotic manipulator of FIG. 3, depicting an alternative embodiment of a spring adjustment mechanism.

FIGS. 4-6 illustrate various embodiments of spring adjustment mechanisms 116 that may be included within a spring compensated joint 110 in accordance with the present disclosure. Although not shown for the purpose of drawing clarity, it is noted that a spring adjustment actuator 117 will be mechanically coupled to the spring adjustment mechanism 116 shown in FIGS. 4-6 to alter the position of the one or more spring attachment points (i.e., A, B, or A and B) and dynamically adjust the lifting force ($F_b$) provided by the gravity compensating spring 115 in real-time.

It is further noted, that while example embodiments of a spring adjustment mechanism 116 are shown in FIGS. 3 and 4-6, these embodiments are not exhaustive or inclusive of all potential implementations of a spring adjustment mechanism in accordance with the present disclosure. In some cases, other embodiments of spring adjustment mechanisms can be coupled to the spring compensated joints 110 disclosed herein to alter the position of one or more spring attachment points (i.e., A, B, or A and B) and adjust the lifting force ($F_b$) provided by the gravity compensating spring 115. The present disclosure is considered to encompass all such embodiments and implementations.

FIG. 4 depicts a simplified representation of the spring adjustment mechanism 116 shown in FIG. 3. As shown in FIG. 4, slider 116b is configured to slide along an axis extending through the first side link 113 to alter the position of spring attachment point B. In one example implementation, slider 116b may be configured to surround and slide along an outer perimeter of the first side link 113. In another example implementation, slider 116b may be configured to slide within a groove formed within first side link 113. As shown in FIG. 4, the position of spring attachment point B may be changed to increase or decrease length 'b', thereby increasing or decreasing the lifting force ($F_b$) provided by the gravity compensating spring 115.

FIG. 5 depicts a simplified representation of a spring adjustment mechanism 116, which differs from the one shown in FIGS. 3 and 4 by positioning the spring adjustment mechanism at spring attachment point A. In the embodiment shown in FIG. 5, one end of the gravity compensating spring 115 is attached to slider 116b at spring attachment point A, while the other end of the spring is attached to the first side link 113 at spring attachment point B. In this embodiment, slider 116b is configured to slide along an axis extending through lower link 112 to alter the position of spring attachment point A. For example, slider 116b may be configured to surround and slide along an outer perimeter of the lower link 112, or may be configured to slide within a groove formed within the lower link 112. As shown in FIG. 5, the position of spring attachment point A may be adjusted to increase or decrease length 'a', thereby increasing or decreasing the lifting force ($F_b$) provided by the gravity compensating spring 115.

FIG. 6 depicts an alternative embodiment of a spring adjustment mechanism 116 that may be included within a spring compensated joint 110 in accordance with the present disclosure. Like the previous embodiment shown in FIG. 4, the spring adjustment mechanism 116 shown in FIG. 6 includes a slider 116b, which is coupled to alter the position of spring attachment point B. Unlike the previous embodiment, however, the spring adjustment mechanism 116 shown in FIG. 6 includes an additional four-bar linkage 119 coupled to slider 116b. The four-bar linkage 119 extends the spring attachment point B beyond the boundary of the first side link 113 and allows translational movement of the slider 116b along an axis, which is not parallel to the axis extending through the first side link 113. In FIG. 6, the position of spring attachment point B may be adjusted to improve the "quality" of gravity compensation when non-ideal springs with non-zero free lengths and non-zero preload forces are used.

FIGS. 7-10 illustrate various embodiments of inertial actuators 118 that may be included within a spring compensated joint 110 in accordance with the present disclosure. Like the previous embodiment shown in FIG. 3, the inertial actuator 118 shown in FIGS. 7-10 may be generally configured to effectuate rotational motion of the joint and apply a force (e.g., an acceleration force) needed to accelerate and manipulate a payload. In some embodiments, a sensor and feedback controller (as shown, e.g., in FIG. 11) may be coupled to the inertial actuator 118 shown in FIGS. 7-10 to dynamically adjust the amount of force needed to accelerate and manipulate a payload, while rejecting or compensating for external disturbances (such as friction and external torques) on the joint.

It is noted, that while example embodiments of an inertial actuator 118 are shown in FIGS. 3 and 7-10, these embodiments are not exhaustive or inclusive of all potential implementations of an inertial actuator in accordance with the present disclosure. In some embodiments, other types of inertial actuators and mechanisms (such as a Hoeken's linkage) can be used to couple an inertial actuator to a spring compensated joint 110. The present disclosure is considered to encompass all such embodiments and implementations.

Figure 7:
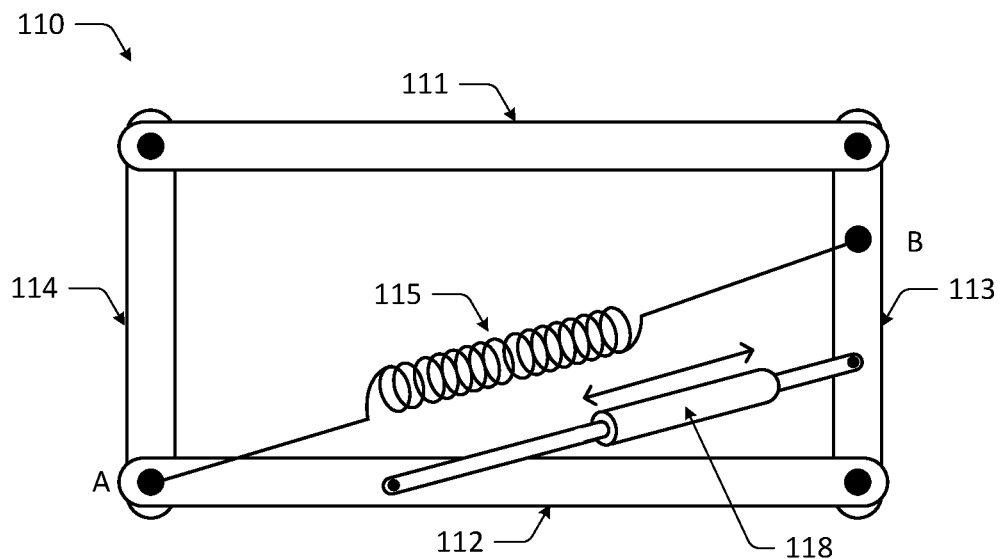
FIG. 7 is a simplified diagram of a single spring compensated joint that may be included within the robotic manipulator of FIG. 3, depicting the inertial actuator coupled between a side link and a lower link of the joint.

FIG. 7 depicts a simplified representation of a spring compensated joint 110 comprising an inertial actuator 118. Like the embodiment shown in FIG. 3, the inertial actuator 118 shown in FIG. 7 is coupled in parallel with the gravity compensating spring 115 and attached diagonally between the lower link 112 and first side link 113 of the spring compensated joint 110. In one embodiment, the inertial actuator 118 shown in FIG. 7 may be a prismatic linear actuator having an electric motor, which is mechanically coupled to one end of a screw drive mechanism, as described above. When coupled between lower link 112 and first side link 113, as shown in FIG. 7, the inertial actuator 118 is configured to translate the second side link 114 with respect to the first side link 113 to effectuate rotational motion of the joint and actively adjust the magnitude of the force applied by the inertial actuator to accelerate the joint and move the robotic manipulator 100 up/down. Although functionally equivalent, the embodiment shown in FIG. 7 differs slightly from the one shown in FIG. 3 by arranging the inertial actuator 118 below the gravity compensating spring 115, as opposed to above the spring.

Figure 8:
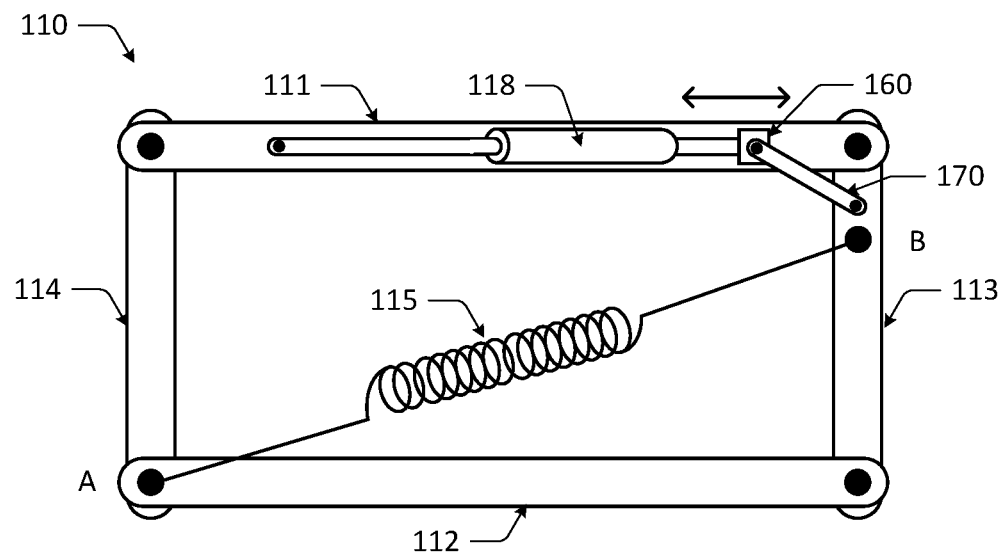
FIG. 8 is a simplified diagram of a single spring compensated joint that may be included within the robotic manipulator of FIG. 3, wherein the joint includes an inertial actuator according to a first alternative embodiment.

FIG. 8 depicts a simplified representation of a spring compensated joint 110 comprising a first alternative embodiment of an inertial actuator 118 in accordance with the present disclosure. Like the previous embodiments shown in FIGS. 3 and 7, the inertial actuator 118 shown in FIG. 10 may be a prismatic linear actuator having an electric motor, which is mechanically coupled to one end of a screw drive mechanism. Unlike the previous embodiments shown in FIGS. 3 and 7, however, the inertial actuator 118 shown in FIG. 8 is arranged along, and in parallel with, the upper link 111 of the spring compensated joint 110. One end of the inertial actuator 118 is coupled to a slider crank mechanism comprising a slider 160 and additional link 170. Slider 160 is configured to move linearly along an axis extending longitudinally through the upper link 111. The additional link 170 is coupled diagonally between slider 160 and the first side link 113 of the spring compensated joint 110.

When coupled as shown in FIG. 8, the inertial actuator 118 is configured to actively adjust the magnitude of the force applied by the inertial actuator to accelerate the joint and move the robotic manipulator 100 up/down. For example, assuming the first side link 113 is adjacent to mechanical ground, the inertial actuator 118 shown in FIG. 8 may be compressed to increase the magnitude of the acceleration force applied to the first side link 113 to raise the opposing side of the joint (i.e., the side comprising second side link 114), thereby increasing the joint orientation angle θ and moving the robotic manipulator 100 in an upward direction. On the other hand, the inertial actuator 118 may be extended to decrease the magnitude of the acceleration force applied to the first side link 113 to lower the opposing side of the joint, thereby decreasing the joint orientation angle θ and moving the robotic manipulator 100 in a downward direction.

Figure 9:
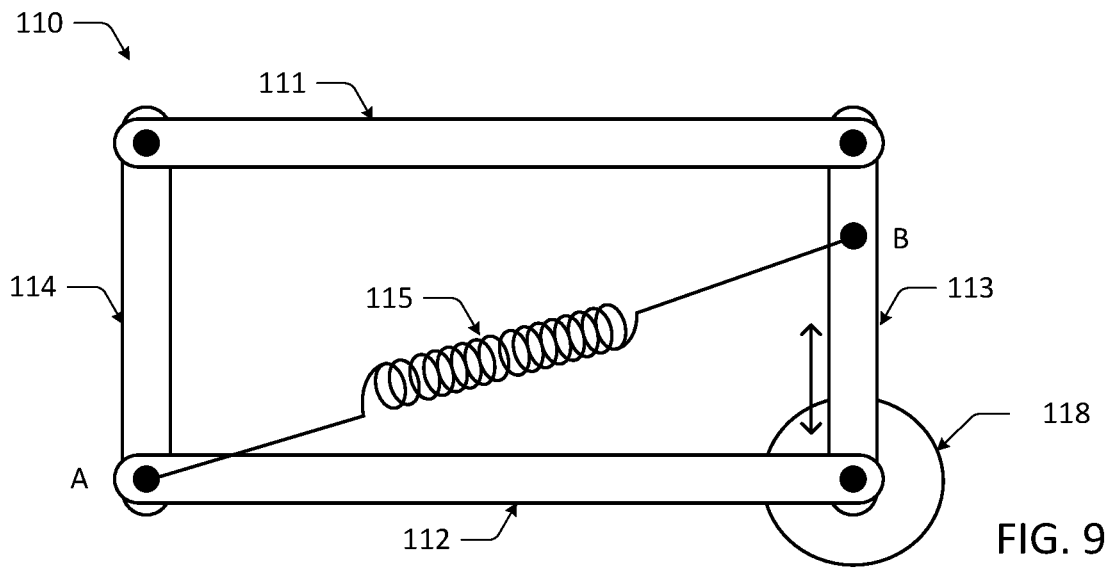
FIG. 9 is a simplified diagram of a single spring compensated joint that may be included within the robotic manipulator of FIG. 3, wherein the joint includes an inertial actuator according to a second alternative embodiment.

FIG. 9 depicts a simplified representation of a spring compensated joint 110 comprising a second alternative embodiment of an inertial actuator 118 in accordance with the present disclosure. Unlike the previous embodiments shown in FIGS. 3, 7 and 8, the inertial actuator 118 shown in FIG. 9 is implemented as a rotational actuator, instead of a linear actuator. The rotational actuator 118 shown in FIG.

9 is coupled between the first side link 113 and lower link 112 of the spring compensated joint 110. In one example implementation, a stator or housing of the rotational actuator 118 shown in FIG. 9 may be coupled to the first side link 113, while the rotor is coupled to the lower link 112 (or vice versa). When coupled in such a manner, the rotational actuator 118 shown in FIG. 9 is configured to actively adjust the magnitude of the torque applied between links 112 and 113 to accelerate the joint and move the robotic manipulator 100 up/down.

Figure 10:
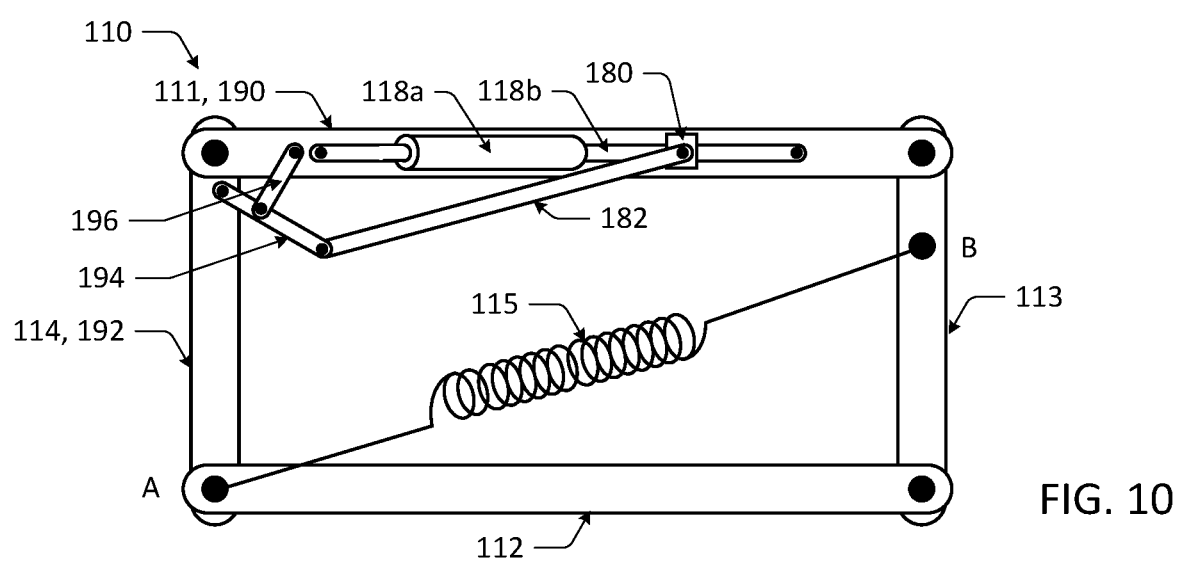
FIG. 10 is a simplified diagram of a single spring compensated joint that may be included within the robotic manipulator of FIG. 3, wherein the joint includes an inertial actuator according to a third alternative embodiment.

FIG. 10 depicts a simplified representation of a spring compensated joint 110 comprising a third alternative embodiment of an inertial actuator 118 in accordance with the present disclosure. Like the previous embodiments shown in FIGS. 3 and 7-8, the inertial actuator 118 shown in FIG. 10 may be a prismatic linear actuator having an electric motor, which is mechanically coupled to one end of a screw drive mechanism. Like the previous embodiment shown in FIG. 8, the inertial actuator 118 shown in FIG. 10 may also be coupled to the upper link 111 and arranged, such that a longitudinal axis of the inertial actuator is parallel with the upper link.

Unlike the previous embodiments shown in FIGS. 3 and 7-8, however, the inertial actuator 118 shown in FIG. 10 is coupled to a slider crank mechanism and an additional four-bar linkage to more efficiently convert linear motion of the inertial actuator into rotational motion of the spring compensated joint 110. As shown in FIG. 10 and described in more detail below, the slider crank mechanism includes a slider 180 and a crank 182. The additional four-bar linkage shown in FIG. 10 is implemented as a Hoeken's linkage, including a first link 190, a second link 192, a third link 194 and a fourth link 196. In the embodiment shown in FIG. 10, the first link 190 of the Hoeken's linkage is the upper link 111 of the four-bar linkage mechanism, and the second link 192 of the Hoeken's linkage is the second side link 114 of the four-bar linkage mechanism.

In the embodiment shown in FIG. 10, inertial actuator 118 is implemented as a prismatic linear actuator having an electric motor 118a mechanically coupled to one end of a screw drive mechanism 118b. The screw drive mechanism 118b of inertial actuator 118 is coupled to the slider 180, which in turn, is coupled to the crank 182 of the slider crank mechanism. As the electric motor 118a drives the screw drive mechanism 118b, slider 180 (e.g., a lead nut) slides along the screw drive mechanism 118b, causing one end of the crank 182 to slide in a direction parallel with the upper link 111 of the four-bar linkage mechanism and the first link 190 of the Hoeken's linkage.

An opposite end of the crank 182 is rotationally coupled to the third link 194 of the Hoeken's linkage, which in turn, is rotationally coupled to the second side link 114 of the four-bar linkage mechanism and the second link 192 of the Hoeken's linkage. One end of the fourth link 196 is rotationally coupled to the third link 194, while the opposite end of the fourth link 196 is rotationally coupled to upper link 111 of the four-bar linkage mechanism and the first link 190 of the Hoeken's linkage. When coupled in such a manner, the Hoeken's linkage (190, 192, 194, 196) converts linear motion of inertial actuator 118 into rotational motion of the spring compensated joint 110 by translating the second side link 114 of the four-bar linkage mechanism with respect to first side link 113.

For example, assuming the first side link 113 is adjacent to mechanical ground, inertial actuator 118 may be compressed to compress the Hoeken's linkage and increase the magnitude of the acceleration force applied to the second side link 114 to pull the second side link down, thereby decreasing the joint orientation angle θ and moving the robotic manipulator 100 in a downward direction. On the other hand, inertial actuator 118 may be extended to elongate the Hoeken's linkage and decrease the magnitude of the acceleration force applied to the second side link 114 to push the second side link up, thereby increasing the joint orientation angle θ and moving the robotic manipulator 100 in an upward direction.

Linear actuators driving rotary joints typically have position-dependent torque profiles due to the nonlinear relationship between linear displacement of the actuator and rotational motion of the joint. This nonlinear relationship can be advantageous in situations where torques experienced by the rotational joint share a similar nonlinear profile relative to angular displacement. However, in the case of the inertial actuator 118 shown in FIG. 10, inertial torques are not dependent on joint angle, and therefore, a non-linear mapping between linear and rotational space is not desirable. The Hoeken's linkage (190, 192, 194, 196) works well in this situation because it is a mechanism that couples linear motion to rotational motion with a nearly constant speed ratio, meaning that the effective joint torque of the inertial actuator 118 remains constant throughout the range of motion of the spring compensated joint 110. As such, the Hoeken's linkage shown in FIG. 10 provides a more efficient mechanism for converting linear motion of the inertial actuator 118 into rotational motion of the spring compensated joint 110 compared, for example, to the previous embodiment shown in FIG. 8.

Various embodiments of spring adjustment mechanisms 116 in accordance with the present disclosure are shown in FIGS. 3-6 and described above. It is noted that, while illustrated as separate embodiments, one or more of the spring adjustment mechanisms 116 shown in FIGS. 3-6 may be combined within a single embodiment to alter the position of one or more spring attachment points (i.e., A, B, or A and B).

Figure 2A:
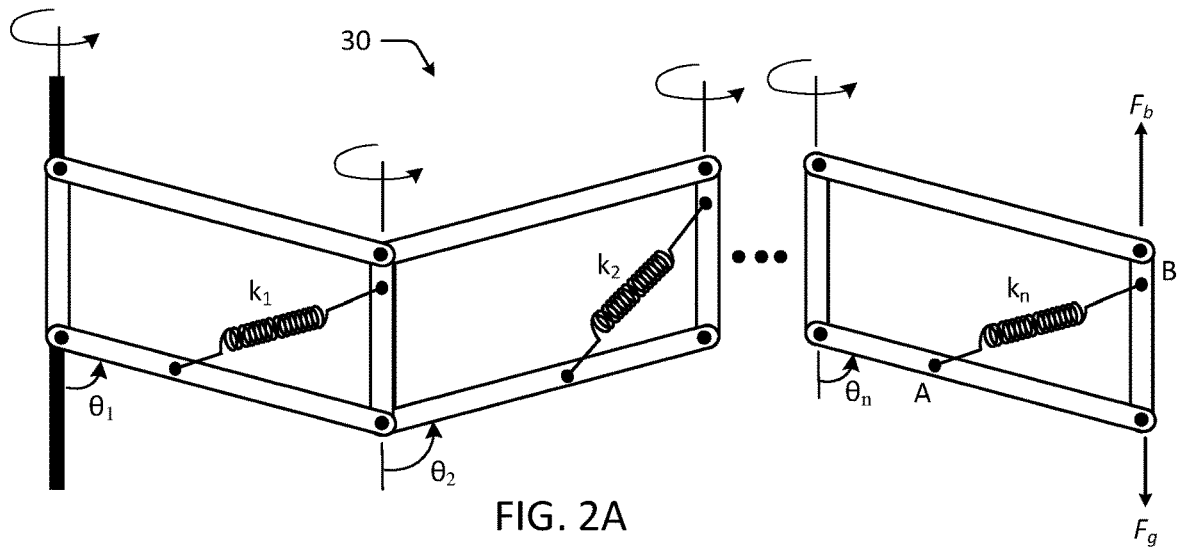
FIG. 2A (prior art) is a conceptual diagram of a gravity-balancing system comprising a serial chain of n parallelograms (e.g., four-bar linkages), where each parallelogram includes a gravity compensating spring coupled diagonally between two links of the parallelogram at attachment points A and B.
Figure 2B:
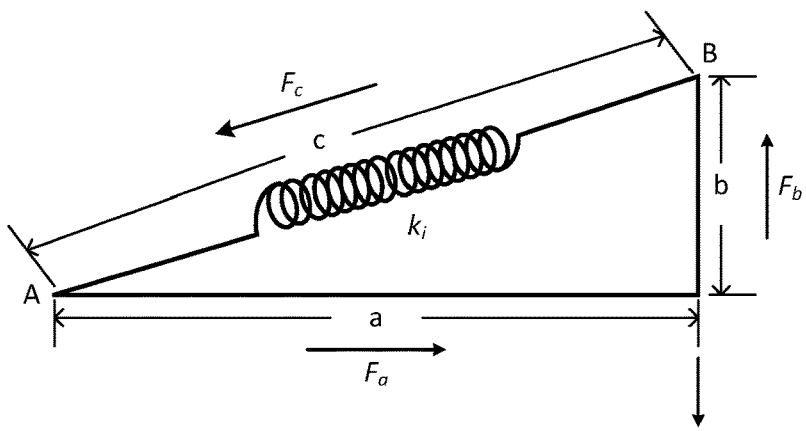
FIG. 2B (prior art) is a vector diagram illustrating the tension and compression forces generated within the linkages and the gravity compensating spring shown in FIG. 2A.

Various embodiments of inertial actuators 118 in accordance with the present disclosure are shown in FIGS. 3 and 7-10 and described above. It is noted that, while illustrated as separate embodiments, one or more of the inertial actuators 118 shown in FIGS. 3 and 7-10 may be combined within a single embodiment to adjust a magnitude of one or more forces (e.g., $F_a$, $F_b$, and/or $F_c$ of FIG. 2B) generated within the spring compensated joint 110.

It is further noted that, while illustrated separately for purposes of drawing clarity, a spring compensated joint 110 in accordance with the present disclosure may combine any of the spring adjustment mechanisms 116 shown in FIGS. 4-6 with any of the inertial actuators 118 shown in FIGS. 7-10.

Figure 11:
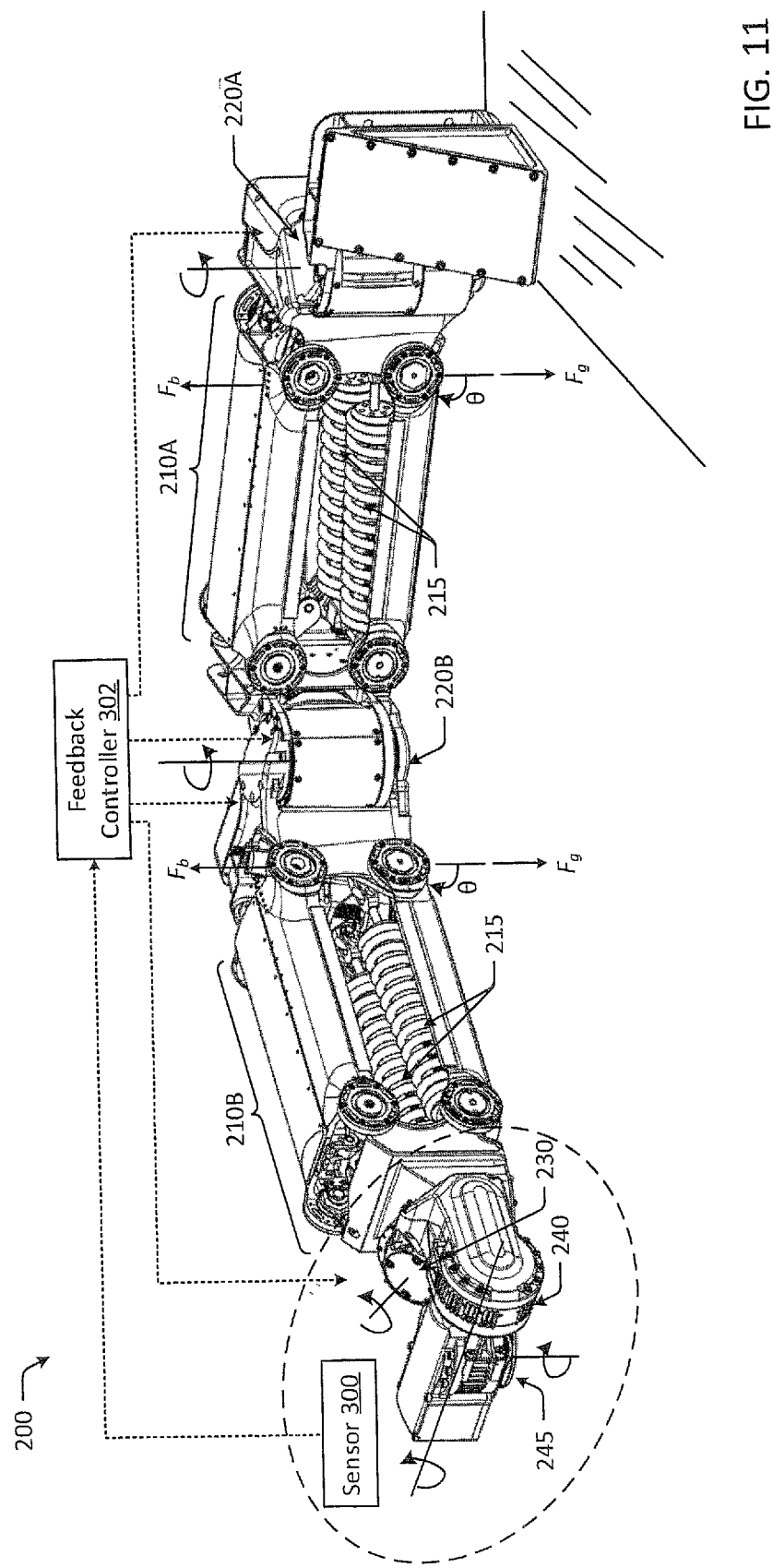
FIG. 11 is a side perspective view illustrating another embodiment of a robotic manipulator having a plurality of spring compensated joints, where each joint includes at least one gravity compensating spring, a spring adjustment mechanism, a spring adjustment actuator, and an inertial actuator.
Figure 12:
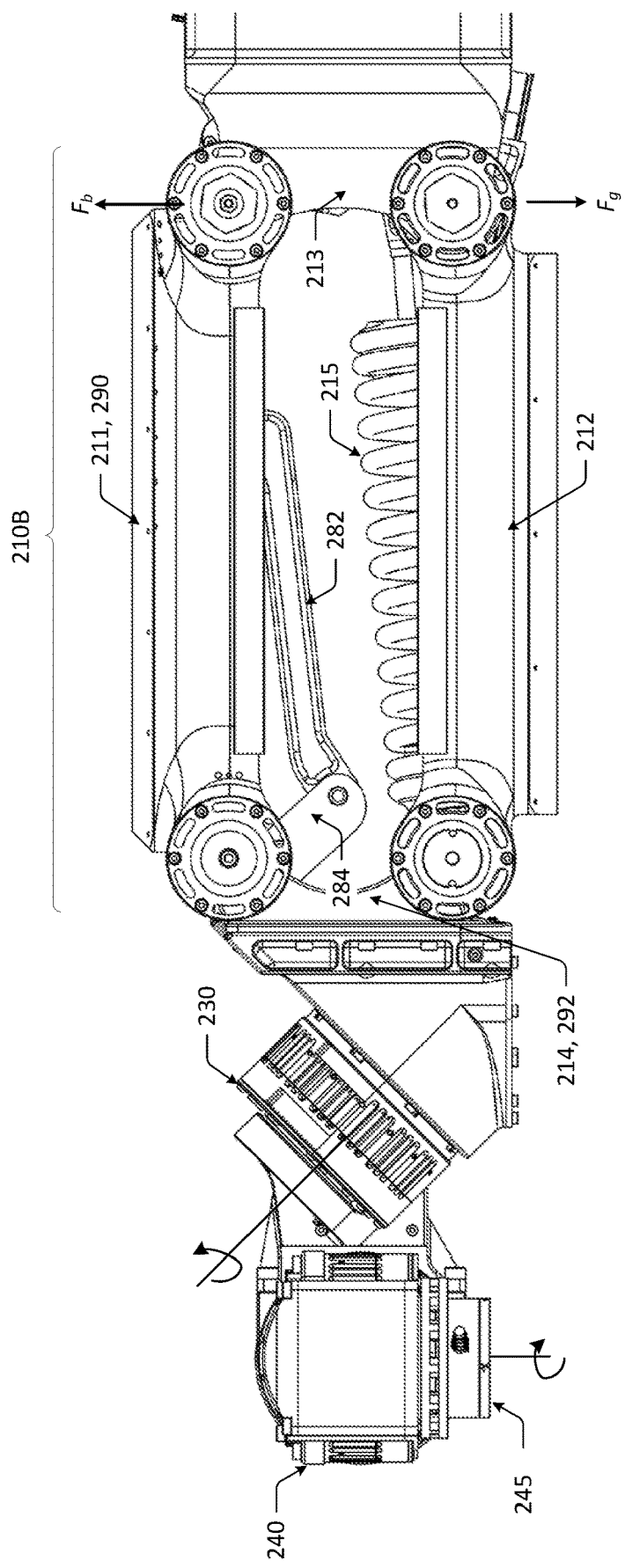
FIG. 12 is a side view of a single spring compensated joint and a serial chain of actuators that may be included within the robotic manipulator of FIG. 11.
Figure 13:
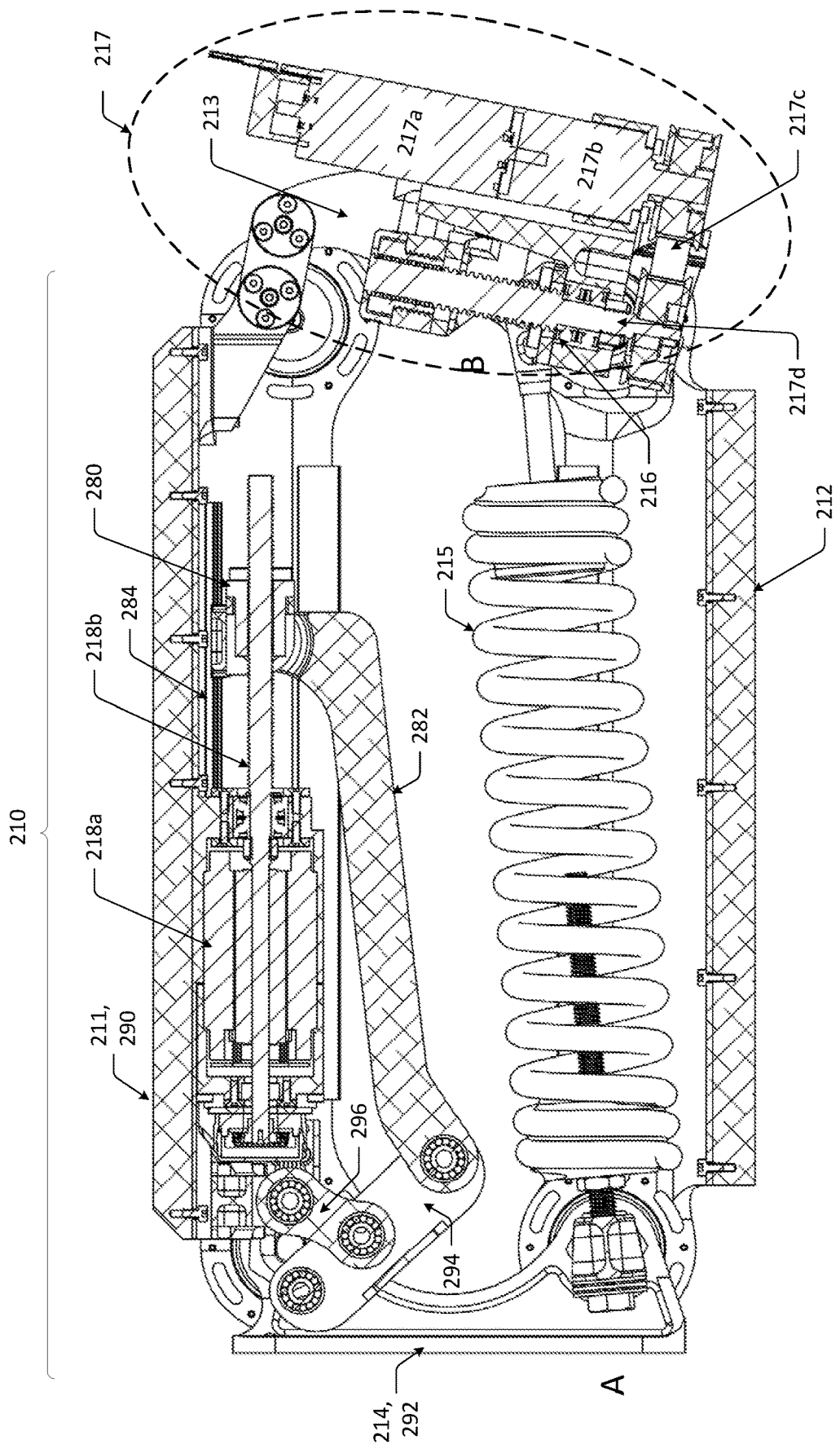
FIG. 13 is a side cross-section view of the single spring compensated joint shown in FIG. 12.

FIG. 11 is a practical implementation of a robotic manipulator 200 including a plurality of spring compensated joints 210A/B in accordance with one embodiment of the present disclosure. FIG. 12 provides a side view of spring compensated joint 210B, illustrating example actuators (230, 240, 245) that may be included within the wrist portion of the robotic manipulator 200 to effectuate movement of the end effector (not shown in FIGS. 11 and 12). FIG. 13 provides a side cross-sectional view of spring compensated joint 210B to better illustrate various internal components included within the joint.

Like the previous embodiment shown in FIG. 3, the robotic manipulator 200 shown in FIG. 11 includes a serial chain of spring compensated joints 210 and actuators, which enable the robotic manipulator to control the position and orientation of a payload in a 3-D spatial environment. In the embodiment shown in FIG. 11, robotic manipulator 200 includes a first spring compensated joint 210A and a second spring compensated joint 210B. Although only two spring compensated joints are shown in FIG. 11, it is expressly noted that robotic manipulator 200 may include one or more additional joints and actuators to provide greater range of motion.

As described in more detail below, each spring compensated joint 210 of robotic manipulator 200 includes a four-bar linkage mechanism (211, 212, 213, 214), at least one gravity compensating spring 215, a spring adjustment mechanism 216, a spring adjustment actuator 217 and an inertial actuator 218. In some embodiments, one or more components of the disclosed spring compensated joint may be configured and/or implemented differently than what is expressly depicted in FIG. 11, while retaining the functionality described herein. The present disclosure is considered to encompass all such configurations and alternative implementations.

In the embodiment shown in FIG. 11, a first spring compensated joint 210A is coupled at one end to a first yaw actuator 220A, which is coupled to mechanical ground. An opposite end of the first spring compensated joint 210A is coupled to a second yaw actuator 220B, which is coupled to one end of a second spring compensated joint 210B. At the freely moving end (e.g., the wrist portion of the robotic manipulator), a serial chain of actuators (e.g., a first actuator 230, a second actuator 240, and a third actuator 245) is coupled between an opposite end of the second spring compensated joint 210B and the end effector (not shown).

As noted above, spring compensated joints 210A and 210B are configured to move the robotic manipulator 200 up and down by adjusting the joint orientation angle θ. Yaw actuators 220A and 220B are configured to pivot the robotic manipulator 200 side-to-side in a plane orthogonal to the gravity vector ($F_g$). The serial chain of actuators (e.g., the first actuator 230, second actuator 240, and third actuator 245) included within the wrist portion of the robotic manipulator 200 are configured to effectuate movement of the end effector (not shown).

In the embodiment shown in FIG. 11, the first actuator 230 is coupled to the second spring compensated joint 210B and configured to rotate the end effector about a tilted axis, which is displaced from the Z-axis by an acute angle (e.g., about 45° from vertical). The second actuator 240 (e.g., a pitch actuator) is coupled to the first actuator 230 and configured to rotate the end effector up and down. The third actuator 245 (e.g., a yaw actuator) is coupled to the second actuator 240 and configured to rotate the end effector side-to-side.

In some embodiments, the actuators (e.g., 220A/B, 230, 240 and/or 245) included within robotic manipulator 200 may each be implemented with a type of rotary actuator (e.g., electric, hydraulic, etc.). In one example implementation, actuators 220A/B, 230, 240 and 245 may each be implemented with some form of geared electromagnetic actuator including an electric motor coupled to a gearbox or drivetrain. In other embodiments, one or more of the actuators included within robotic manipulator 200 may implemented with linear actuators. For example, yaw actuators 220A and 220B may implemented with linear actuators, if an additional slider crank mechanism is provided at each joint to convert the linear motion of the linear actuators into rotational motion at the joints.

Like the previous embodiment shown in FIG. 3, each of the spring compensated joints 210A/B included within robotic manipulator 200 may generally include a four-bar linkage mechanism (211, 212, 213, 214), at least one gravity compensating spring 215, a spring adjustment mechanism 216, a spring adjustment actuator 217 and an inertial actuator 218. As described in more detail below, the at least one gravity compensating spring 215 may be coupled between two different links of the four-bar linkage mechanism (211, 212, 213, 124) at two different spring attachment points (A, B). The spring adjustment mechanism 216 may be coupled to one end of the at least one gravity compensating spring 215 and configured to adjust a position of at least one of the spring attachment points (A and/or B) to adjust a lifting force ($F_b$) provided by the spring 215. The spring adjustment actuator 217 may be coupled to move the spring adjustment mechanism 216 to alter the position of the at least one spring attachment point and dynamically alter an amount of gravity compensating torque, which is applied by the gravity compensating spring 215 when a payload handled by robotic manipulator 200 changes. Finally, the inertial actuator 218 may be coupled between links of the four-bar linkage mechanism to effectuate rotational movement of the four-bar linkage mechanism, and to apply an adjustable amount of force to accelerate and manipulate a payload handled by the robotic manipulator 200.

As shown most clearly in FIG. 12, the four-bar linkage mechanism may generally include an upper link 211 arranged parallel to a lower link 212, and a first side link 213 arranged parallel to a second side link 214. The first and second side links 213 and 214 may be coupled between the upper and lower links 211 and 212 at distal ends thereof to form a parallelogram structure. As noted above, the parallelogram structure constrains motion between the links of the four-bar linkage mechanism in a way that allows translation, but not rotation, of opposite links. As such, any torque applied to the end effector (not shown) is transmitted directly through the serially coupled spring compensated joints and actuators of robotic manipulator 200 to mechanical ground.

As noted above, at least one gravity compensating spring 215 may be coupled to the parallelogram structure of each spring compensated joint 210A/210B between two links of the four-bar linkage mechanism. In the embodiment shown in FIGS. 11-13, two gravity compensating springs 215 are coupled diagonally between attachment points A on second side link 214 and attachment points B on first side link 213. When coupled in such a manner, the two gravity compensating springs 215 each provide a lifting force ($F_b$) in a direction opposing the gravitational load force ($F_g$), thereby providing a significantly greater lifting force than provided by the single gravity compensating spring 115 shown in FIG. 3. As before, characteristics (e.g., length, stiffness, etc.) of the gravity compensating springs 215 may be selected to counter-balance the weight of robotic manipulator 200 and its payload, so that it ideally behaves as if its motion is in a gravity-less environment when carrying a payload.

As noted above, it is not strictly necessary to attach the gravity compensating springs 215 diagonally between links of the four-bar linkage mechanism in all embodiments. In some embodiments, the gravity compensating springs 215 may be alternatively oriented within the four-bar linkage mechanism and attached, for example, to a cable that spans the four-bar linkage mechanism diagonally via pulleys. Together, the gravity compensating springs, cable and pulleys may provide the lifting force ($F_b$) needed to oppose the gravitational load force ($F_g$).

In the embodiment shown in FIGS. 11-13, a spring adjustment mechanism 216 and a spring adjustment actuator 217 may be coupled to the gravity compensating springs 215 to alter a position of one or more attachment points of the springs 215 and adjust the amount of lifting force ($F_b$) provided thereby. In the illustrated embodiment, spring adjustment mechanism 216 and spring adjustment actuator 217 are coupled to the gravity compensating springs 215 at spring attachment point B. It is recognized, however, that the spring adjustment mechanism 216 and spring adjustment actuator 217 are not strictly limited to spring attachment point B and may be alternatively coupled to other spring attachment points, as shown for example in the alternative embodiments depicted in FIGS. 4-6.

In one embodiment, spring adjustment actuator 217 may be a linear actuator having an electric motor 217a, which is directly or indirectly connected to a lead screw 217d. In one example implementation, the motor shaft of the electric motor 217a may be coupled to a gearbox 217b and belt transmission 217c, which are coupled and configured to drive the lead screw 217d. In the embodiment shown in FIGS. 11-13, the spring adjustment mechanism 216 is fixedly attached to the lead screw 217d of the spring adjustment actuator 217 at spring attachment point B.

The spring adjustment mechanisms 216 and spring adjustment actuators 217 adjust the position of spring attachment point B by translating lead screw 217d up/down along an axis, which is substantially parallel to the first side link 213. By driving the lead screw 217d (and thus, the spring adjustment mechanism 216 fixedly attached thereto) to a desired position, the spring adjustment actuator 217 provides the active actuation needed to alter the position of spring attachment point B and adjust the lifting force ($F_b$) provided by the gravity compensating springs 215.

In some embodiments, the lead screw 217d is forward drivable to change the position of the spring attachment point B, but it is not back drivable, so that the spring adjustment actuator 217 does not need to constantly expend energy holding its position to counteract the spring's force. In other embodiments, however, the lead screw 217d could be forward drivable and back drivable. In such embodiments, an additional braking mechanism may be required to prevent the spring adjustment actuator 217 from constantly expending energy to hold its position.

The spring adjustment mechanism 216 and the spring adjustment actuator 217 described herein provide an adjustable lifting force ($F_b$) to counteract substantially 100% of the gravity torque on robotic manipulator 200. In some embodiments, the spring adjustment actuator 217 may be configured to adjust the lifting force needed to compensate for gravitational load forces on a fixed payload. In other embodiments, a sensor 300 and feedback controller 302 may be coupled to spring adjustment actuator 217 to adjust the lifting force needed to compensate for gravitational load forces on dynamically varying payloads.

In one example implementation, a force/torque sensor 300 may be located within the wrist portion of the robot manipulator 200 to directly measure the force/torque of a payload. The output of the force/torque sensor 300 is supplied to a feedback controller 302, which is coupled to the spring adjustment actuator 217. When the force/torque sensor 300 senses a change in payload, the feedback controller 302 supplies a signal to the spring adjustment actuator 217 to alter the position of the gravity compensating springs 215 and adjust the lifting force ($F_b$) needed to compensate for the change in payload. When active feedback control is used, the position of the gravity compensating springs 215 is dynamically adjusted in real-time, so that robotic manipulator 200 is nearly perfectly gravity compensated regardless of payload.

Inertial actuator 218 is coupled between links of the spring compensated joint 210 to effectuate rotational movement of the joint and apply an adjustable amount of force to accelerate and manipulate the payload. Similar to the embodiments shown in FIGS. 8 and 10, inertial actuator 218 is coupled to upper link 211 and arranged, so that a longitudinal axis of the actuator is parallel to the upper link Like the embodiment shown in FIG. 10, inertial actuator 218 includes a slider crank mechanism and a Hoeken's linkage to more efficiently convert linear motion of the actuator into rotational motion of the spring compensated joint 210. As shown in FIG. 13 and described in more detail below, the slider crank mechanism includes a slider 280 and a crank 282. The Hoeken's linkage includes a first link 290, a second link 292, a third link 294 and a fourth link 296. In the embodiment shown in FIG. 11, the first link 290 of the Hoeken's linkage is the upper link 211 of the four-bar linkage mechanism, and the second link 292 of the Hoeken's linkage is the second side link 214 of the four-bar linkage mechanism.

As shown in FIG. 13, inertial actuator 218 may be implemented as a prismatic linear actuator having an electric motor 218a mechanically coupled to one end of a screw drive mechanism 218b. The screw drive mechanism 218b of inertial actuator 218 is coupled to the slider 280, which in turn, is coupled the crank 282 of the slider crank mechanism. More specifically, and as shown in FIG. 13, one end of crank 282 is coupled to slider 280 and configured to slide along a linear guide 284, which is coupled to an underside of the upper link 211. As electric motor 218a drives screw drive mechanism 218b, slider 280 slides along the screw drive mechanism, causing the one end of crank 282 to slide along the linear guide 284 in a direction parallel with the upper link 211.

An opposite end of crank 282 is rotationally coupled to the third link 294 of the Hoeken's linkage, which in turn, is rotationally coupled to the second side link 214 of the four-bar linkage mechanism and the second link 292 of the Hoeken's linkage. One end of the fourth link 296 is rotationally coupled to the third link 294, while the opposite end of the fourth link 296 is rotationally coupled to upper link 211 of the four-bar linkage mechanism and the first link 290 of the Hoeken's linkage. When coupled in such a manner, the Hoeken's linkage (290, 292, 294, 296) converts linear motion of the inertial actuator 218 into rotational motion of the spring compensated joint 210 by translating the second side link 214 of the four-bar linkage mechanism with respect to the first side link 213.

For example, assuming the first side link 213 is adjacent to mechanical ground, the inertial actuator 218 may be compressed to compress the Hoeken's linkage and increase the magnitude of the acceleration force applied to the second side link 214 to pull the second side link down, thereby decreasing the joint orientation angle θ and moving the robotic manipulator 200 in a downward direction. On the other hand, the inertial actuator 218 may be extended to elongate the Hoeken's linkage and decrease the magnitude of the acceleration force applied to the second side link 214 to push the second side link up, thereby increasing the joint orientation angle θ and moving the robotic manipulator 200 in an upward direction.

Like the previous embodiment shown in FIG. 3, the inertial actuator 218 shown in FIG. 13 may be configured to apply an adjustable amount of force to move robotic manipulator 200 up/down, and to accelerate and manipulate a payload handled by the robotic manipulator while counteracting external torques and disturbances. In some embodiments, the inertial actuator 218 may be configured to increase/decrease the force needed to accelerate/decelerate a payload of fixed weight, and to manipulate the fixed payload in a desired direction. In other embodiments, a sensor 300 and feedback controller 302 may be coupled to the inertial actuator 218 to sense and dynamically adjust the force needed to manipulate and accelerate payloads regardless of weight.

In one example implementation, a force/torque sensor 300 may be located within the wrist portion of the robot manipulator 200 to directly measure the force/torque of a payload, as noted above and shown in FIG. 11. The output of the force/torque sensor 300 is supplied to a feedback controller 302, which is coupled to inertial actuator 218. When the force/torque sensor 300 senses a change in payload, the feedback controller 302 supplies a signal to the inertial actuator 218 to adjust the acceleration force needed to compensate for the change in payload. When active feedback control is used, the force needed to manipulate and accelerate payloads is dynamically adjusted in real-time, so that robotic manipulator 200 can smoothly transition between payloads regardless of weight.

Regardless of whether active feedback control is provided, the effort and energy consumed by the inertial actuator 218 is greatly reduced by the gravity compensating torque provided by the spring adjustment actuator 217. Because the spring adjustment actuator 217 provides a gravity compensating torque that offsets substantially 100% of the gravity torque (i.e., the largest torque source) on robotic manipulator 200, the inertial actuator 218 only needs to compensate for the remaining torque sources (i.e., inertial, friction and external torques) when moving the robotic manipulator 200 from point to point.

As noted above, a feedback controller 302 may be coupled to the spring adjustment actuator 217 and the inertial actuator 218, in some embodiments. In the embodiment shown in FIG. 11, a single feedback controller 302 (shown in block diagram form) is coupled for controlling one or more of the actuators (217, 218, 220A, 220B, 230, 240 and 245) included within the robotic manipulator. It is recognized, however, that a plurality of feedback controllers 302 may alternatively be located throughout the robotic manipulator 200 for controlling the actuator(s) contained therein.

In some embodiments, a sensor 300 may be coupled to the feedback controller 302, as noted above. In the embodiment shown in FIG. 11, a force/torque sensor 300 (shown in block diagram form) is located within the wrist portion of robot manipulator 200 and configured to measure the force/torque of a payload handled by the robotic manipulator. When the sensor 300 senses a change in payload, the feedback controller 302 supplies signals to the spring adjustment actuator 217 and the inertial actuator 218 to dynamically adjust the lifting force ($F_b$) and the acceleration force needed to manipulate and accelerate payloads, in real-time.

It is recognized, however, that sensor 300 is not strictly necessary and may be omitted in some embodiments. In some embodiments, one or more of the feedback controllers 302 disclosed herein may detect changes in payload through mathematical modeling and current detection. For example, one or more of the feedback controllers 302 disclosed herein may detect when the mass of the robotic manipulator 200 changes (due to lifting or dropping a payload) by modeling the mass of each spring compensated joint 210A/B and using a current measured in the motor(s) of one or more of the actuators (217, 218, 220A, 220B, 230, 240 and 245). When the feedback controller(s) 302 detect a change in the mass of the robotic manipulator 200, the feedback controller(s) 302 may supply signals to the spring adjustment actuator 217 and the inertial actuator 218 to dynamically adjust the lifting force ($F_b$) and the acceleration force needed to manipulate and accelerate payloads in real-time.

As noted above, conventional robotic manipulators typically contain one actuator per joint, while some contain a gravity compensating spring at the base joint (i.e., the first joint) to help offset gravity torques. In an effort to improve upon conventional robotic manipulators, the present disclosure decomposes the actuation problem down into three separate components, i.e., gravity compensating spring(s) 115/215, spring adjustment 116/117/216/217, and inertial actuation 118/218, which requires a large degree of engineering design effort, knowledge of control dynamics, and software integration to accomplish.

The gravity compensating spring(s) 115/215, spring adjustment mechanism(s) 116/216 and spring adjustment actuator(s) 117/217 provide the robotic manipulator 100/200 disclosed herein with a "smart gravity compensation" feature, which allows payloads to vary dynamically and in real-time. This is not possible with conventional iso-elastic mechanisms or conventional robotic manipulators that utilize gravity balancing techniques. In some embodiments, the smart gravity compensation feature can accommodate for changes in the gravity vector of the system. For example, the manipulator ground can change orientations and the smart gravity compensation feature can compensate for the changes to the perceived payload dynamically and in real-time.

As noted above, the spring adjustment mechanism 116/216 and spring adjustment actuator 117/217 may be configured to dynamically adjust the position of the gravity compensating spring(s) 115/215, so that the robotic manipulator 100/200 is nearly perfectly gravity compensated regardless of payload weight. The gravity compensating spring(s) 115/215 support not only the gravitational forces of the robotic manipulator 100/200, but also of the payload. When the robotic manipulator 100/200 picks up a new object, the position of the gravity compensating spring(s) 115/215 will be readjusted by the spring adjustment mechanism 116/216 and spring adjustment actuator 117/217 to compensate for the newly added mass of the payload. In this way, the robotic manipulator 100/200 is always adapting to payloads when they are added or removed. This represents an important advantage over conventional iso-elastic mechanisms and robotic manipulators that utilize gravity balancing techniques. In the disclosed robotic manipulator, the gravity compensating spring(s) 115/215 are able to support 100% of the gravity loads, so that the inertial actuator 118/218 need only provide inertial acceleration of the payload to and from rest and compensate for external disturbances.

In the present disclosure, the inertial actuator 118/218 is configured to position the robotic manipulator 100/200 (e.g., by accelerating and decelerating the manipulator arm) while compensating for dynamically accelerating variable payloads. In addition, the inertial actuator 118/218 disclosed herein may be configured to reject or compensate for external disturbance forces on the robotic manipulator 100/200 (e.g., if someone pushes on the arm). In some embodiments, the inertial actuator 118/218 may be configured to reject external disturbances based on a programmed mechanical impedance (e.g., feedback gains). For example, the inertial actuator 118/218 may be configured to modulate a mechanical impedance of the robotic manipulator 100/200, so that the manipulator arm feels "soft" and moves easily with external disturbances (e.g., in a human-safe mode), or feels "stiff" and rejects external disturbances for maximum positional accuracy.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus, the invention is not limited to only those combinations shown herein, but rather may include other combinations.

What is claimed is:

1. An apparatus, comprising:
   a four-bar linkage mechanism including an upper link arranged parallel to a lower link and a first side link arranged parallel to a second side link, wherein the first and second side links are coupled between the upper and lower links at distal ends thereof to form a parallelogram structure;
   at least one gravity compensating spring coupled to the parallelogram structure, wherein the at least one gravity compensating spring is attached between two links of the four-bar linkage mechanism at two different spring attachment points;
   a spring adjustment mechanism coupled to one end of the at least one gravity compensating spring and configured to adjust a position of at least one of the spring attachment points, the spring adjustment mechanism comprising a slider configured to adjust the position of the at least one spring attachment point by translating the at least one spring attachment point along an axis substantially parallel to the first side link; and
   a spring adjustment actuator coupled to move the spring adjustment mechanism to alter the position of the at least one spring attachment point and dynamically alter an amount of gravity compensating torque applied by the at least one gravity compensating spring when a payload handled by the apparatus changes.

2. The apparatus as recited in claim 1, wherein the at least one gravity compensating spring comprises two gravity compensating springs, each of which is gravity compensating spring coupled diagonally within the parallelogram structure and attached between two links of the four-bar linkage mechanism at two different spring attachment points.

3. The apparatus as recited in claim 1, further comprising an inertial actuator coupled between links of the four-bar linkage mechanism to effectuate rotational movement of the four-bar linkage mechanism and apply an adjustable amount of force to accelerate and manipulate the payload.

4. The apparatus as recited in claim 3, wherein the inertial actuator is a prismatic linear actuator, which is coupled diagonally between the lower link and the first side link of the four-bar linkage mechanism.

5. The apparatus as recited in claim 3, wherein the inertial actuator is a rotational actuator comprising a stator and a rotor, wherein the stator is coupled to the first side link and the rotor is coupled to the lower link, or vice versa.

6. The apparatus as recited in claim 3, wherein the inertial actuator is a prismatic linear actuator, which is coupled to the upper link and arranged, so that a longitudinal axis of the inertial actuator is parallel with the upper link.

7. The apparatus as recited in claim 6, further comprising a slider crank mechanism coupled between one end of the inertial actuator and the first side link, wherein the slider crank mechanism is configured to convert linear motion of the inertial actuator into rotational motion of the apparatus.

8. The apparatus as recited in claim 6, further comprising a slider crank mechanism and an additional four-bar linkage coupled between the inertial actuator and one or more links of the four-bar linkage mechanism, wherein the slider crank mechanism and the additional four-bar linkage are configured to convert linear motion of the inertial actuator into rotational motion of the apparatus.

9. A robotic manipulator, comprising:
   a plurality of spring compensated joints, each including:
      a four-bar linkage mechanism including an upper link arranged parallel to a lower link and a first side link arranged parallel to a second side link, wherein the first and second side links are coupled between the upper and lower links at distal ends thereof to form a parallelogram structure;
      at least one gravity compensating spring coupled between two links of the four-bar linkage mechanism at two different spring attachment points to provide a lifting force ($F_b$) in a direction opposing a gravitational load force ($F_g$);
      a spring adjustment mechanism coupled to one end of the at least one gravity compensating spring to alter a position of at least one of the spring attachment points, the spring adjustment mechanism comprising:
         a lead screw positioned adjacent and parallel to the first side link; and
         a slider coupled to the lead screw and to the one end of the at least one gravity compensating spring; and
      a spring adjustment actuator coupled to move the spring adjustment mechanism to alter the position of the at least one spring attachment point and adjust the amount of the lifting force ($F_b$) provided by the at least one gravity compensating spring.

10. The robotic manipulator as recited in claim 9, wherein the at least one gravity compensating spring comprises two gravity compensating springs, each gravity compensating spring coupled diagonally between two links of the four-bar linkage mechanism at two different spring attachment points.

11. The robotic manipulator as recited in claim 9, wherein the spring adjustment actuator is coupled to the lead screw and configured to adjust the position of the at least one spring attachment point by translating the lead screw up/down along an axis, which is substantially parallel to the first side link.

12. The robotic manipulator as recited in claim 9, further comprising:
   a sensor coupled to measure at least one of a force or a torque of a payload handled by the robotic manipulator; and
   a feedback controller coupled to the sensor and the spring adjustment actuator, wherein the feedback controller is configured to use an output of the sensor to alter the at least one spring attachment point and dynamically adjust the lifting force in real-time to compensate for gravitational load forces on dynamically varying payloads.

13. The robotic manipulator as recited in claim 9, wherein each spring compensated joint further comprises an inertial actuator coupled between links of the four-bar linkage mechanism to effectuate rotational movement of the four-bar linkage mechanism and apply an adjustable amount of force to accelerate and manipulate a payload handled by the robotic manipulator.

14. The robotic manipulator as recited in claim 13, wherein the inertial actuator is a prismatic linear actuator, which is coupled to the upper link and arranged, so that a longitudinal axis of the inertial actuator is parallel with the upper link.

15. The robotic manipulator as recited in claim 14, wherein each spring compensated joint further comprises a slider crank mechanism and a Hoeken's linkage coupled between the inertial actuator and one or more links of the four-bar linkage mechanism, wherein the slider crank mechanism and the Hoeken's linkage is configured to convert linear motion of the inertial actuator into rotational motion of the spring compensated joint.

16. The robotic manipulator as recited in claim 14, further comprising:
   a sensor coupled to measure at least one of a force or a torque of a payload handled by the robotic manipulator; and
   a feedback controller coupled to the sensor and the inertial actuator, wherein the feedback controller is configured to use an output of the sensor to dynamically adjust a force applied by the inertial actuator to manipulate and accelerate dynamically varying payloads.

17. The robotic manipulator as recited in claim 9, wherein the plurality of spring compensated joints includes a first spring compensated joint and a second spring compensated joint.

18. The robotic manipulator as recited in claim 17, further comprising a first yaw actuator, a second yaw actuator, a third yaw actuator, wherein:
   the first yaw actuator is coupled to mechanical ground;
   the first spring compensated joint is coupled between the first yaw actuator and the second yaw actuator; and
   the second spring compensated joint is coupled between the second yaw actuator and the third yaw actuator.

19. The robotic manipulator as recited in claim 18, further comprising a pitch actuator coupled to the third yaw actuator, a roll actuator coupled to the pitch actuator and an end effector coupled to the roll actuator.

20. The robotic manipulator as recited in claim 17, further comprising a first yaw actuator, a second yaw actuator, a serial chain of actuators and an end effector, wherein:
   the first yaw actuator is coupled to mechanical ground;
   the first spring compensated joint is coupled between the first yaw actuator and the second yaw actuator; and
   the second spring compensated joint is coupled between the second yaw actuator and the serial chain of actuators, which are further coupled to the end effector.

21. The robotic manipulator as recited in claim 20, wherein the serial chain of actuators comprises:
   a first actuator coupled to one end of the second spring compensated joint, wherein the first actuator is configured to rotate the end effector about a tilted axis;
   a second actuator coupled to the first actuator, wherein the second actuator is configured to rotate the end effector up and down; and
   a third actuator coupled to the second actuator, wherein the third actuator is configured to rotate the end effector side-to-side.

22. An apparatus, comprising:
   a four-bar linkage mechanism including an upper link arranged parallel to a lower link and a first side link arranged parallel to a second side link, wherein the first and second side links are coupled between the upper and lower links at distal ends thereof to form a parallelogram structure;
   at least one gravity compensating spring coupled to the parallelogram structure, wherein the at least one gravity compensating spring is attached between two links of the four-bar linkage mechanism at two different spring attachment points;
   a spring adjustment mechanism coupled to one end of the at least one gravity compensating spring and configured to adjust a position of at least one of the spring attachment points, wherein the spring adjustment mechanism comprises a slider configured to adjust the position of the at least one spring attachment point by translating the at least one spring attachment point along an axis substantially parallel to the lower link; and
   a spring adjustment actuator coupled to move the spring adjustment mechanism to alter the position of the at least one spring attachment point and dynamically alter an amount of gravity compensating torque applied by the at least one gravity compensating spring when a payload handled by the apparatus changes.

23. The apparatus as recited in claim 22, wherein the at least one gravity compensating spring comprises two gravity compensating springs, each gravity compensating spring coupled diagonally within the parallelogram structure and attached between two links of the four-bar linkage mechanism at two different spring attachment points.

24. The apparatus as recited in claim 22, further comprising an inertial actuator coupled between links of the four-bar linkage mechanism to effectuate rotational movement of the four-bar linkage mechanism and apply an adjustable amount of force to accelerate and manipulate the payload.

25. The apparatus as recited in claim 24 wherein the inertial actuator is a rotational actuator comprising a stator and a rotor, wherein the stator is coupled to the first side link and the rotor is coupled to the lower link, or vice versa.

26. An apparatus, comprising:
   a four-bar linkage mechanism including an upper link arranged parallel to a lower link and a first side link arranged parallel to a second side link, wherein the first and second side links are coupled between the upper and lower links at distal ends thereof to form a parallelogram structure;
   at least one gravity compensating spring coupled to the parallelogram structure, wherein the at least one gravity compensating spring is attached between two links of the four-bar linkage mechanism at two different spring attachment points;
   a spring adjustment mechanism coupled to one end of the at least one gravity compensating spring and configured to adjust a position of at least one of the spring attachment points, wherein the spring adjustment mechanism comprises a slider coupled to an additional four-bar linkage, wherein the additional four-bar linkage extends the at least one spring attachment point beyond a boundary of the first side link and enables the slider to translate the at least one spring attachment point along an axis that is not parallel to an axis extending through the first side link; and
   a spring adjustment actuator coupled to move the spring adjustment mechanism to alter the position of the at least one spring attachment point and dynamically alter an amount of gravity compensating torque applied by the at least one gravity compensating spring when a payload handled by the apparatus changes.

27. The apparatus as recited in claim 26, further comprising an inertial actuator coupled between links of the four-bar linkage mechanism to effectuate rotational movement of the four-bar linkage mechanism and apply an adjustable amount of force to accelerate and manipulate the payload.

28. The apparatus as recited in claim 27, wherein the inertial actuator is a rotational actuator comprising a stator and a rotor, wherein the stator is coupled to the first side link and the rotor is coupled to the lower link, or vice versa.

29. The apparatus as recited in claim 27, wherein the inertial actuator is a prismatic linear actuator.

30. A robotic manipulator, comprising:
- a plurality of spring compensated joints, each including:
  - a four-bar linkage mechanism including an upper link arranged parallel to a lower link and a first side link arranged parallel to a second side link, wherein the first and second side links are coupled between the upper and lower links at distal ends thereof to form a parallelogram structure;
- at least one gravity compensating spring coupled between two links of the four-bar linkage mechanism at two different spring attachment points to provide a lifting force ($F_b$) in a direction opposing a gravitational load force ($F_g$);
- a spring adjustment mechanism coupled to one end of the at least one gravity compensating spring to alter a position of at least one of the spring attachment points; and
- a spring adjustment actuator coupled to move the spring adjustment mechanism, so as to alter the position of the at least one spring attachment point and adjust the amount of the lifting force ($F_b$) provided by the at least one gravity compensating spring,
- wherein each spring compensated joint further comprises an inertial actuator coupled between links of the four-bar linkage mechanism to effectuate rotational movement of the four-bar linkage mechanism and apply an adjustable amount of force to accelerate and manipulate a payload handled by the robotic manipulator.

31. The robotic manipulator as recited in claim 30, wherein the inertial actuator is a prismatic linear actuator coupled to the upper link and arranged, so that a longitudinal axis of the inertial actuator is parallel with the upper link.

32. The robotic manipulator as recited in claim 31, wherein each spring compensated joint further comprises a slider crank mechanism and a Hoeken's linkage coupled between the inertial actuator and one or more links of the four-bar linkage mechanism, wherein the slider crank mechanism and the Hoeken's linkage is configured to convert linear motion of the inertial actuator into rotational motion of the spring compensated joint.

33. The robotic manipulator as recited in claim 31, further comprising:
- a sensor coupled to measure at least one of a force or a torque of a payload handled by the robotic manipulator; and
- a feedback controller coupled to the sensor and the inertial actuator, wherein the feedback controller is configured to use an output of the sensor to dynamically adjust a force applied by the inertial actuator to manipulate and accelerate dynamically varying payloads.

34. The robotic manipulator as recited in claim 30, wherein the at least one gravity compensating spring comprises two gravity compensating springs, each gravity compensating spring coupled diagonally between two links of the four-bar linkage mechanism at two different spring attachment points.

35. The robotic manipulator as recited in claim 30, further comprising:
- a sensor coupled to measure at least one of a force or a torque of a payload handled by the robotic manipulator; and
- a feedback controller coupled to the sensor and the spring adjustment actuator, wherein the feedback controller is configured to use an output of the sensor to alter the at least one spring attachment point and dynamically adjust the lifting force in real-time to compensate for gravitational load forces on dynamically varying payloads.

* * * * *

UNITED STATES PATENT AND TRADEMARK OFFICE
CERTIFICATE OF CORRECTION

PATENT NO. : 11,691,269 B2  
APPLICATION NO. : 17/290554  
DATED : July 4, 2023  
INVENTOR(S) : Nicholas Paine et al.

Page 1 of 1

It is certified that error appears in the above-identified patent and that said Letters Patent is hereby corrected as shown below:

On the Title Page

Page 2:
In Column 2 (Other Publications), Line 27, delete "Ro bot" and insert -- Robot --

In the Claims

In Column 23, Line 46 (Claim 2), after "each" delete "of which is"

Signed and Sealed this
Twenty-sixth Day of September, 2023

Katherine Kelly Vidal  
*Director of the United States Patent and Trademark Office*